US012709790B2

(12) United States Patent
Waeckerle et al.

(10) Patent No.: US 12,709,790 B2
(45) Date of Patent: Aug. 18, 2026

(54) METHOD FOR FABRICATING A SUBSTANTIALLY EQUIATOMIC FeCo-ALLOY COLD-ROLLED STRIP OR SHEET, AND MAGNETIC PART CUT FROM SAME

(71) Applicant: APERAM, Luxembourg (LU)

(72) Inventors: Thierry Waeckerle, Nevers (FR); Rémy Batonnet, Decize (FR)

(73) Assignee: APERAM, Luxembourg (LU)

( * ) Notice: Subject to any disclaimer, the term of this patent is extended or adjusted under 35 U.S.C. 154(b) by 406 days.

(21) Appl. No.: 18/265,623

(22) PCT Filed: Dec. 9, 2020

(86) PCT No.: PCT/IB2020/061694

§ 371 (c)(1),
(2) Date: Jun. 6, 2023

(87) PCT Pub. No.: WO2022/123297

PCT Pub. Date: Jun. 16, 2022

(65) Prior Publication Data

US 2024/0035139 A1 Feb. 1, 2024

(51) Int. Cl.

| | |
|---|---|
| ***C22F 1/16*** | (2006.01) |
| ***C22C 30/02*** | (2006.01) |
| ***C22F 1/00*** | (2006.01) |
| ***C22F 1/02*** | (2006.01) |
| ***H01F 1/16*** | (2006.01) |

(52) U.S. Cl.

CPC ................ *C22F 1/16* (2013.01); *C22C 30/02* (2013.01); *C22F 1/002* (2013.01); *C22F 1/02* (2013.01); *H01F 1/16* (2013.01); *C22C 2202/02* (2013.01)

(58) Field of Classification Search

None

See application file for complete search history.

(56) References Cited

U.S. PATENT DOCUMENTS

2013/0000794 A1 1/2013 Pieper et al.
2014/0283953 A1* 9/2014 Waeckerle ............... C21D 8/12 148/310

FOREIGN PATENT DOCUMENTS

| | | | |
|---|---|---|---|
| CN | 103114234 | A | 5/2013 |
| EP | 2 791 377 | A1 | 10/2014 |
| FR | 2 651 242 | A1 | 3/1991 |
| JP | 2011-174103 | A | 9/2011 |
| JP | 2015-508447 | A | 3/2015 |
| JP | 2019-537248 | A | 12/2019 |
| WO | WO-2013/087939 | A1 | 6/2013 |

OTHER PUBLICATIONS

PCT App. PCT/IB2020/061694; International Search Report mailed May 14, 2021.

* cited by examiner

*Primary Examiner* — Jenny R Wu

(74) *Attorney, Agent, or Firm* — MARSHALL, GERSTEIN & BORUN LLP

(57) ABSTRACT

The application relates to a substantially equiatomic FeCo-alloy cold-rolled strip or sheet, and to a magnetic part cut from same, as well as to a method for fabricating a Fe—Co-alloy cold-rolled strip or sheet. A first cold-rolling step is carried out with a reduction rate of 70% to 90%, to bring the strip or sheet to a thickness of ≤1 mm. Intermediate annealing is carried out when running, leading to a partial recrystallization of the strip or sheet, running at a speed (V) A second step of cold-rolling the annealed strip or sheet is carried out, with a reduction rate of 60% to 80%, to bring the strip or sheet to a thickness of 0.05 to 0.25 mm. And final annealing (Rf) of the cold-rolled strip or sheet is carried out to achieve complete recrystallization followed by cooling at 100 to 500° C./hour.

11 Claims, 2 Drawing Sheets

METHOD FOR FABRICATING A SUBSTANTIALLY EQUIATOMIC FeCo-ALLOY COLD-ROLLED STRIP OR SHEET, AND MAGNETIC PART CUT FROM SAME

The present invention relates to the field of cold-rolled strips and sheets of magnetic materials and to parts cut from such strips and sheets, and more particularly to strips and sheets made of substantially equiatomic FeCo-alloy.

Substantially equiatomic magnetic nuclei made of soft magnetic FeCo-alloy (thus containing substantially equal weight and atomic quantities of Fe and Co), to which are often added about 2% V, have long been known to allow high power-to weight or power-to-volume ratios to be obtained during energy conversions in electrical engineering. When seeking for reducing as much as possible the magnetic losses, which are a source of heat dissipation, it is known that it is necessary to reduce the thickness of the strips forming the core, which have been cut from the preceding strips or sheets.

In industrial practice, it is common to produce cold-rolled strips and sheets of equiatomic FeCo with a thickness of about 0.1 mm. However, the magnetic losses associated with such materials are still considered to be insufficiently lowered. An additional lowering can be achieved by producing strips and sheets of high purity in terms of residual elements and inclusions, through the use of new raw materials and the execution of one or multiple remelts during the production of the metal in the form of an ingot. Low magnetic losses on the order of 25 W/kg at 400 Hz for a 0.1 mm thick strip can thus be obtained for a maximum sinusoidal induction of 2T. However, such method of production is expensive because the method requires at least one additional remelting compared to the usual equiatomic FeCo-alloys.

As an example, the following results are observed on samples of reference metal having the following compositions, in percentages by weight, summarized in Table 1. The elements which are not mentioned are present, at most, only as impurities (traces) resulting from the melting, and without any metallurgical influence.

TABLE 1

| Casting compositions with reference Ref 1 to Ref 5 | | | |
|---|---|---|---|
| | Ref 1 (without remelting) | Ref 2 and Ref 4 (with remelting) | Ref 3 and Ref 5 (with remelting) |
| C % | 0.007 | 0.0024 | 0.0021 |
| Mn % | 0.034 | 0.037 | 0.063 |
| Si % | 0.020 | 0.052 | 0.037 |
| S % | 0.0035 | <0.0018 | 0.0020 |
| P % | 0.0032 | 0.0020 | 0.0050 |
| Ni % | 0.15 | 0.024 | <0.01 |
| Cr % | 0.017 | 0.018 | 0.049 |
| Mo % | <0.005 | <0.0050 | <0.0050 |
| Cu % | 0.006 | 0.01 | 0.0083 |
| Co % | 48.71 | 48.76 | 48.68 |
| V % | 1.97 | 2.00 | 2.00 |
| Nb % | 0.041 | <0.005 | 0.0020 |
| Fe % | 48.8 | 48.9 | 49.0 |
| N % | 0.0032 | 0.0043 | 0.0028 |
| Al % | 0.0007 | 0.0004 | 0.0006 |
| Ti % | 0.0001 | 0.0002 | 0.0001 |
| W % | <0.01 | <0.01 | <0.01 |
| B % | 0.00006 | 0.00008 | 0.00011 |

TABLE 1-continued

| Casting compositions with reference Ref 1 to Ref 5 | | | |
|---|---|---|---|
| | Ref 1 (without remelting) | Ref 2 and Ref 4 (with remelting) | Ref 3 and Ref 5 (with remelting) |
| Zr % | <0.0001 | <0.0001 | <0.0001 |
| Ta % | <0.0001 | <0.0001 | <0.0001 |
| O % | 0.0041 | 0.0033 | 0.0028 |
| Ca % | <0.0001 | <0.0001 | <0.0001 |
| Mg % | <0.0001 | <0.0001 | <0.0001 |

The Ref 1 casting did not undergo remelting, unlike other castings, but only vacuum induction melting (VIM), which leads to maintaining the usual inclusionary distribution of Fe—Co alloys, in particular vanadium, silicon, aluminum, magnesium, calcium oxides, etc., and also niobium and aluminum nitrides, silicon carbides. Table 1 which is limited to the composition of the samples, cannot account for such inclusionary richness using part of the elements in solution in the metal.

The remelting of the castings Ref 2To Ref 5 were carried out on the castings first produced by VIM, without the addition of Nb, by vacuum arc remelting (VAR), which has the main effect of removing or fragmenting a significant part of the stable precipitates (oxides, carbides, nitrides) of the metal matrix coming from the VIM, and also of directly removing, by applying a vacuum, a part of the impurities not precipitated in the matrix (S, N, O).

The reference castings were transformed hot, by blooming and passage through the strip mill (hot-rolling), into strips with a thickness of 2 mm, then hyper-quenched, before a single cold-rolling down to a thickness of 0.1 mm.

In such final state of thickness, washers of format 36 (external diameter)×30.5 mm (internal diameter) or 36 (external diameter)×25 mm (internal diameter), or tape-wound toroidal cores in format 30×20 mm (external and internal diameter respectively)×10 mm (toroidal core height, corresponding to the width of the strip) can be produced, depending on whether one is interested in a “rotating machines” (washers) or a “transformer” (tape-wound toroidal core) application.

In all cases, the materials tested were heat-treated for 3 h under pure hydrogen, at 850° C. for the samples Ref 1, Ref 2 and Ref 3, at 880° C. for the samples Ref 4 and Ref 5. The cooling following the heat treatment was in all cases carried out at a rate of 250° C./hour in order to optimize the magnetic performance. It is for said cooling rate that the first magnetocrystalline anisotropy constant K1 (which largely controls the magnetic properties) is canceled out.

Wound-tape toroidal cores are representative of what would be seen in a single-phase or three-phase transformer core application, whereas washers are representative of a rotary actuator application, more particularly at high speeds.

The results of the measurements of coercive field Hc, of losses at 2T and 400 Hz, and the increase in the losses observed between the washers and the toroidal cores are summarized in Table 2

TABLE 2

Measurements of coercive field and of magnetic losses performed on the reference samples shown in Table 1

| Sample | Performing a VAR | Type of sample | Hc (Oe) | Losses at 2 T, 400 Hz (W/kg) | Increased losses between washer and toroidal core |
|---|---|---|---|---|---|
| With final heat treatment at 850° C. | | | | | |
| Ref 1 | WITHOUT | Tape-wound toroidal core Ø30 × 20-H20 mm | 0.65 | 31.2 | |
| Ref 2 | WITH | Washers diam. 36 × 25 mm | 0.38 | 20.1 | |
| | WITH | Tape-wound toroidal core Ø30 × 20-H20 mm | 0.47 | 22.6 | +10% |
| Ref 3 | WITH | Washers diam. 36 × 25 mm | 0.37 | 19.5 | |
| | WITH | Tape-wound toroidal core Ø30 × 20-H20 mm | 0.42 | 20.6 | +5% |
| With final heat treatment at 880° C. | | | | | |
| Ref 4 | WITH | Washers diam. 36 × 25 mm | 0.29 | 17.7 | |
| | WITH | Tape-wound toroidal core Ø30 × 20-H20 mm | 0.35 | 19.2 | +8% |
| Ref 5 | WITH | Washers diam. 36 × 25 mm | 0.31 | 18.1 | |
| | WITH | Tape-wound toroidal core Ø30 × 20-H20 mm | 0.33 | 17.9 | +10% |

It can be seen that the use of a remelting reduces by about 30%, the magnetic losses on the toroidal cores (comparison of Ref 1 with Ref 2 or Ref 3 on wound-tape toroidal cores), which is very significant for many applications.

It can also be seen that depending on whether the measurement is carried out on the toroidal cores along the direction of rolling DL, or whether it is carried out on the washers thus using all the directions of the sheet, the magnetic losses are 5 to 10% higher for the toroidal cores. The above indicates a certain anisotropy of the performances in the rolling plane.

On the other hand, the increase of the final annealing temperature, going from 850 to 880° C., significantly reduces the level of magnetic losses both on toroidal cores and on washers, as shown by the comparisons of Ref 2 and Ref 4 on the one hand, and of Ref 3 and Ref 5 on the other hand.

The goal of the invention is to propose to manufacturers of strips or sheets of equiatomic FeCo-alloys and of products cut from such strips or sheets, a means of obtaining very low magnetic losses, typically 26.5 W/kg or lower under an induction of 2T at 400 Hz, without requiring expensive production, due to the choice of raw materials as in the succession of metallurgical operations.

To this end, the subject matter of the invention is a method for manufacturing a cold-rolled strip or sheet of substantially equiatomic FeCo-alloy, characterized in that:

a hot-rolled sheet or strip with a thickness ($e_{HR}$) comprised between 1.5 and 2.5 mm is prepared, the composition of which consists, in percentages by weight, of:

47.0%≤Co≤51.0%; preferentially 47.0%≤Co≤49.5%;
traces≤V+W≤3.0%; preferentially 0.5%≤V+W≤2.5%;
traces≤Ta+Zr≤0.5%;
traces≤Nb≤0.5%, preferentially traces≤Nb≤0.1%;
traces≤B≤0.05%; preferentially traces≤B≤0.005%;
traces≤Si≤3.0%;
traces≤Cr≤3.0%;
traces≤Ni≤5.0%; preferentially traces≤Ni≤0.1%;
traces≤Mn≤2.0%; preferentially traces≤Mn≤0.1%;
traces≤C≤0.02%; preferentially traces≤C≤0.01%;
traces≤O≤0.03%; preferentially traces≤O≤0.01%;
traces≤N≤0.03%; preferentially traces≤N≤0.01%;
traces≤S≤0.005%; preferentially traces≤S≤0.002%;
traces≤P≤0.015; preferentially traces≤P≤0.007%;
traces≤Mo≤0.3%; preferentially traces≤Mo≤0.1%;
traces≤Cu≤0.5%; preferentially traces≤Cu≤0.1%;
traces≤Al≤0.01%; preferentially traces≤Al≤0.002%;
traces≤Ti≤0.01%; preferentially traces≤Ti≤0.002%;
traces≤Ca+Mg≤0.05%; preferentially traces≤Ca+Mg≤0.001%;
traces≤rare earths≤500 ppm;

the rest being iron and impurities resulting from the melting;

said strip or sheet having a recrystallization beginning temperature (Trc) and a 100% recrystallized microstructure;

a first cold-rolling step (LAF1) of the strip, or of the sheet, is then carried out in one or a plurality of passes, with an overall reduction ratio (TR1) of 70 to 90%, preferentially of 65 to 75%, to bring the strip or sheet to a thickness (e1) less than or equal to 1 mm, preferentially less than or equal to 0.6 mm;

an intermediate annealing (R1) is then carried out as the strip or sheet passes through an annealing furnace, leading to a partial recrystallization of the strip or sheet, said strip or sheet passing through said annealing furnace at a speed (V), the degree of partial recrystallization being from 10 to 50%, preferentially 15 to 40%, better still 15 to 30%, and where the temperature of the strip or of the sheet, in the effective zone of the furnace having an effective length (Lu), is comprised between Trc and 900° C., preferentially between 700 and 880° C., the strip or the sheet remaining in the effective zone (Lu) for 15 s to 5 min at a temperature (T) such that 26° C. min≤(T−Trc)·Lu/V≤160° C. min, preferentially 50° C. min≤(T−Trc)·Lu/V≤160° C. min, with T and Trc in ° C., Lu in m, V in m/min, and the strip or sheet at the exit of the furnace being cooled at a rate of at least 600° C./hour, preferentially at least 1000° C./hour, more preferentially at least 2000° C./hour, down to a temperature less than or equal to 200° C.;

a second cold-rolling step (LAF2) of the annealed strip or sheet is then carried out, in one or a plurality of passes, with an overall reduction ratio of 60 to 80%, preferentially 65 to 75%, bringing the cold-rolled strip or sheet to a thickness (e2) of 0.05 to 0.25 mm;

the cold-rolled strip or sheet or a part previously cut from the strip then undergoes a static final annealing (Rf) for at least 30 minutes, preferentially at least 1 hour, at a temperature of 750 to 900° C., preferentially from 800 to 900° C., better still between 850 and 880° C., in a neutral or reducing atmosphere, or under vacuum, in order to obtain a complete recrystallization of the strip or of the sheet or of the cut piece, followed by cooling at a rate of 100 to 500° C./hour, preferentially between 200 and 300° C./hour.

According to a variant of the invention, (V+W)/2+(Ta+Zr)/0.2≥0.8%, preferentially ≥1.0%.

According to a variant of the invention, traces≤Si≤0.1%.

According to a variant of the invention, traces≤Cr≤0.1%.

According to a variant of the invention, before said first cold-rolling step (LAF1), at least one additional cold-rolling cycle (LAFi)+intermediate annealing (Ri) is carried out to bring the cold-rolled strip or sheet to a thickness comprised between the thickness thereof after hot-rolling ($e_{HR}$) and the input thickness of the first cold-rolling (LAF1), the passage time of the strip in the effective zone of the furnace, situated between Trc and 900° C., during each additional annealing (Ri), leading to a total recrystallization of the strip or of the sheet, the intermediate annealings (Ri) having a passage time in the zone of length Lu of the furnace, where the temperature of the strip is between Trc and 900° C., of 10 s to 10 min, and preferentially of between 15 s and 5 min, better still between 30 s and 5 min, followed by a cooling of the strip or of the sheet at the exit of the furnace at a rate of at least 600° C./hour, preferentially at least 1000° C./hour, more preferentially at least 2000° C./hour, down to a temperature less than or equal to 200° C., the strip or sheet having a 100% recrystallized microstructure after the last of said additional annealings (Ri).

After the hot-rolling and before the first cold-rolling (LAF1), the hot-rolled strip or sheet can undergo hyper-quenching, by cooling the hot-rolled strip or sheet from a temperature comprised between 800 and 1000° C. at a rate of at least 600° C./second, preferentially at least 1000° C./second, more preferentially at least 2000° C./second, down to room temperature.

Said hyper-quenching can take place directly after the hot-rolling, without any intermediate reheating.

The atmospheres of the annealing furnaces can be reducing atmospheres, preferentially pure hydrogen.

The at least one additional intermediate annealing can be a continuous annealing of the strip or sheet in an annealing furnace where the temperature of the strip or sheet, in the effective zone of the furnace, is between Trc and 900° C., with the strip residing in the effective zone for 15 s to 5 min, the strip or sheet at the outlet of the furnace being cooled at a rate of at least 600° C./hour, preferentially at least 1000° C./hour, more preferentially at least 2000° C./hour, down to a temperature less than or equal to 200° C., and the at least one additional cold-rolling (LAFi) being performed in one or a plurality of passes, with an overall reduction rate of at least 40%.

After the final static annealing (Rf), an additional continuous annealing of the strip or sheet can be carried out, so that the metal reaches at least 700° C. and at most 900° C., for at least 10 seconds and at most 1 h, preferentially 10 s to 20 min, followed by cooling at a rate of at least 1000° C./hour.

The invention further relates to a substantially equiatomic FeCo-alloy, characterized in that:

the composition thereof consists of, in percentages by weight:

47.0%≤Co≤51.0%; preferentially 47.0%≤Co≤49.5%;
traces≤V+W≤3.0%; preferentially 0.5%≤V+W≤2.5%;
traces≤Ta+Zr≤0.5%;
traces≤Nb≤0.5%, preferentially traces≤Nb≤0.1%;
traces≤B≤0.05%; preferentially traces≤B≤0.005%;
traces≤Si≤3.0%;
traces≤Cr≤3.0%;
traces≤Ni≤5.0%; preferentially traces≤Ni≤0.1%;
traces≤Mn≤2.0%; preferentially traces≤Mn≤0.1%;
traces≤C≤0.02%; preferentially traces≤C≤0.01%;
traces≤O≤0.03%; preferentially traces≤O≤0.01%;
traces≤N≤0.03%; preferentially traces≤N≤0.01%;
traces≤S≤0.005%; preferentially traces≤S≤0.002%;
traces≤P≤0.015; preferentially traces≤P≤0.007%;
traces≤Mo≤0.3%; preferentially traces≤Mo≤0.1%;
traces≤Cu≤0.5%; preferentially traces≤Cu≤0.1%;
traces≤Al≤0.01%; preferentially traces≤Al≤0.002%;
traces≤Ti≤0.01%; preferentially traces≤Ti≤0.002%;
traces≤Ca+Mg≤0.05%; preferentially traces≤Ca+Mg≤0.001%;
traces≤rare earths≤500 ppm;

the rest being iron and impurities resulting from the melting;

in that the microstructure of the alloy is completely recrystallized;

and in that the texture of said alloy is the following:

8 to 20%, preferentially 9 to 20%, by surface area or by volume, of component {001}<110> disoriented by 15° at the most;

8 to 25%, preferentially 9 to 20%, by surface area or by volume, of component {111}<112> c disoriented by a maximum of 15°;

5 to 15%, preferentially 6 to 11%, by surface area or by volume, of {1111}<110> component disoriented by a maximum of 15°;

the remainder of the material consisting of other texture components, by a maximum of 15°, each representing 15% at maximum by area or by volume, the overlap of said other texture components with any of the components {001}<110>, {111}<112> and {111}<110> not exceeding 10% by area and by volume.

According to a variant of the invention, (V+W)/2+(Ta+Zr)/0.2≥0.8%, preferentially ≥1.0%.

According to a variant of the invention, traces≤Si≤0.1%.

According to a variant of the invention, traces≤Cr≤0.1%.

A further subject matter of the invention is a magnetic part cut out of substantially equiatomic FeCo-alloy, characterized in that same results from cutting a strip or a sheet made of alloy of the preceding type.

A further subject matter of the invention is a magnetic core made of substantially equiatomic FeCo-alloy, characterized in that same is made from cut-out magnetic parts of the preceding type.

As it will have been understood, the invention consists above all in obtaining a strip or a sheet by means of a succession of process steps including cold-rolling in at least two steps, i.e. at least two cold-rolling passes or at least two groups of successive cold-rolling passes, the two passes or groups of passes, which will be called LAF1 and LAF2, being separated by a specific intermediate annealing R1 of only partial recrystallization, performed continuously between the two passes or the two groups of passes. Just after the two passes/groups of passes, a final static annealing is finally performed, the latter leading to the obtaining of a fully recrystallized strip. Such steps are applied to an alloy of well-defined composition, and the treatment conditions result in the creation, within the cold-rolled and annealed strip or sheet, of a particular texturing according to three main given texture components and in given proportions.

Also, the sequence of two cold-rolling operations separated by annealing leading only to partial recrystallization has to begin on a strip which is 100% recrystallized after the hot-rolling operation and any subsequent treatments, if any.

All such features gives the strip or the sheet the remarkably low magnetic losses thereof.

Hereinafter in the text, when we talk about a “cold-rolling step” and the reduction rate thereof, it should be understood that we will include the case where the cold-rolling step is carried out in a plurality of passes performed in immediate succession, hence without any intermediate annealing, and that the reduction rate of the “cold-rolling step” is the overall rate obtained at the end of all the passes of the step, if there is a plurality of passes.

When the invention is applied, there is, surprisingly, no need to have available, a metal with high chemical purity and high inclusivity in order to obtain the expected performance, although it is still preferable to start from the lowest possible concentrations of impurities and inclusions, in order to obtain yet better performance than the performance of comparable existing products.

The above implies that common raw materials can be used, and not necessarily new raw materials containing few residual elements and various impurities, and that a multiple remelting can be dispensed with during the production of the ingot from which the strips or sheets will be obtained. Of course, when it is desired to obtain strips or sheets having exceptionally low magnetic losses, such operations are not excluded from the method according to the invention. However, such operations are no longer needed for obtaining magnetic losses considered to be “low” according to the conventional criteria defined hereinabove.

It turns out that the use of the succession of steps according to the invention, applied to a substantially equiatomic FeCo-alloy, to which it is also possible to add certain alloying elements in relatively limited quantities, leads to obtaining a particular texture where the components {001}<110>, {1111}<112> and also, but possibly to a lesser extent, {1111}<110>, are present within precise limits and with a precise maximum disorientation for each of the components.

Remarkably, such texture tolerates relatively high concentrations of impurities in the alloy, in order to obtain low magnetic losses, and leads to obtaining magnetic losses which are even particularly low if the impurities are at a low level, on the order of what was necessary with the methods of the prior art, as used for the manufacture of strips and sheets of equiatomic FeCo-alloys in order to obtain only low magnetic losses.

The invention will be better understood through the following description, given as reference to the following enclosed drawings.

Figure 1:
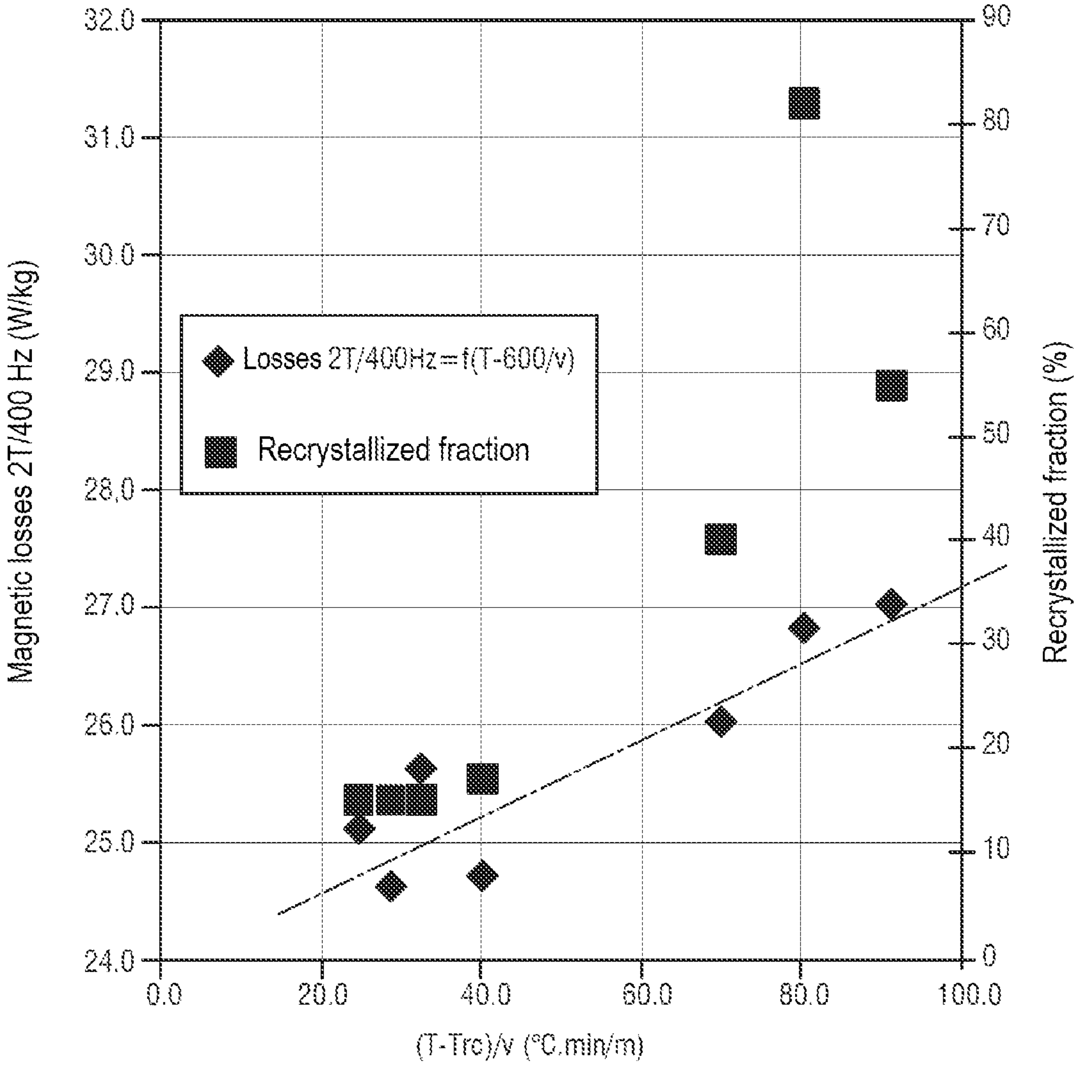
FIG. 1 shows, in W/kg, the magnetic losses under a field of 2T 400 Hz and the recrystallized fraction of various samples, as a function of the quantity $(T-Trc)/V$ in ° C.·min/m.

In the formulae, T and Trc are expressed in ° C., Lu in m, V in m/min

The invention discusses substantially equiatomic FeCo-alloys with the following composition. All percentages are percentages by weight. When talking about the presence of “traces”, it should be understood that the element in question might be totally absent, or be present only as an impurity, resulting from the simple melting of the raw materials and from the production of the liquid metal, where the concentration can be at the limit of possibility of detection of the element by the measuring apparatus used. The above includes the case where the measuring apparatus would indicate a low presence of the element whereas the actual concentration would be zero.

The concentration of Co is comprised between 47.0 and 51.0% and preferentially between 47.0 and 49.5% Such concentration is necessarily close to the equiatomic composition of about 49% Co and 49% Fe for a FeCo-alloy, containing, in addition, about 2% of V.

The binary FeCo equiatomic alloy is known to have, remarkably, both a very high saturation magnetization value JSAT (2.35 T) and a very low magnetocrystalline anisotropy constant K1, that a cooling rate on the order of 250° C./hour (most generally 100 to 500° C./hour, but preferentially 200 to 300° C./hour) after the final annealing, can cancel or, at least, greatly decrease. The low or even zero magnetocrystalline anisotropy constant largely determines the magnetic properties of the alloy under direct current or under low frequency alternating current.

The concentration of V+W is comprised between traces and 3.0%, and preferentially between 0.5 and 2.5%.

The presence of V and/or W is intended for reducing the rate of weakening order below 700° C., which allows the hyper-quenching to be performed, which very preferentially follows the hot-forming, to preserve a good ductility of the metal for cold-rolling. 2% of V also makes it possible to double the electrical resistivity compared with a FeCo without V, which leads to a considerable reduction in magnetic losses at low and, especially, medium frequencies, and thus in particular, appreciable over the entire range of electrical engineering applications, typically a few tens of Hz for low frequency terrestrial applications, and a few hundred to a few thousand Hz typically for aeronautical applications (generator, transformer, smoothing inductance). From 2% of V on, and depending on the final annealing temperature Rf, we enter the bi-phase range $\alpha+\gamma$, which is unfavorable to the magnetic performance of the alloy. Beyond 3.0% of V, and whatever the temperature of the final annealing Rf, non-magnetic austenite $\gamma$ is formed, and the magnetic performance then becomes clearly mediocre for the usual applications of the equiatomic FeCo-alloys. The addition of V, and/or W, which has substantially the same effects, is thus not recommended if same goes beyond the aforementioned 3.0% limit for the sum V+W.

The sum of the concentrations of Ta and Zr is comprised between traces and 0.5%.

Ta and Zr, like V and W, slow down the rate of ordering. In this respect, an addition of 0.2% of Ta has the same effect as 2% of V and W. However, Ta and Zr have no influence on the electrical resistivity, and the addition of V and W is thus preferred for the usual uses intended for the alloys concerned by the invention.

In order to take into account the respective effects of V and W, on the one hand, and of Ta and Zr, on the other hand, on the rate of ordering, a weighting of the effects of the two groups of elements should preferentially be carried out according to the formula:

$$(V+W)/2+(Ta+ZR)/0.2 \geq 0.8\%, \text{ preferentially } \geq 1.0\%.$$

However, the upper limits for the concentrations of V+W and Ta+Zr which were given herein above have to be satisfied as well.

The concentration of Nb is comprised between traces and 0.5%, and preferentially between traces and 0.1%.

The possible addition of Nb can be interesting for preventing the occurrence of embrittling phases during the possible reheating which precedes the hyper-quenching of the hot-formed semi-finished product, and thus allow the cold-rolling operations to be successful. But Nb is a powerful inhibitor of grain growth and makes the growth much more difficult during the final static annealing Rf. Achieving good magnetic properties is thus compromised if the concentration of Nb is too high. Moreover, Nb easily combines with C, N and O to form carbides, nitrides, carbonitrides or oxides, which contribute to slowing the growth of the grains and degrade the magnetic properties, either directly (by trapping the Bloch walls) or indirectly (by limiting the grain size).

Thereby, depending on the methods used: production with or without remelting, production with oxidation, nitriding, carburization, whether limited or not, of the liquid metal, performing a heating, of variable length of time, before the hyper-quenching, or hyper-quenching carried out directly after the hot-forming, just a few 1/100% of Nb, typically 0.10% and e.g. 0.04% or 0.07% Nb can be added. Beyond 0.5%, the inhibitory effect on grain growth is excessive for obtaining the magnetic properties sought.

The concentration of B is comprised between traces and 0.05% B has a role similar to the role of Nb, but is thus also embrittling, and the presence thereof has to be limited accordingly.

The concentration of Si is comprised between traces and 3.0%, in certain cases between traces and 0.1%.

The concentration of Cr is comprised between traces and 3.0%, in certain cases between traces and 0.1%.

Si and Cr are known for the ability thereof to significantly increase the electrical resistivity of materials. However, in the specific case of equiatomic FeCo-alloys, such function is, or could be, already provided by V, W, Ta, Zr. Also, Cr and Si do not reduce the rate of ordering, unlike V, whereas such reduction is highly preferred for the alloys used in the invention.

Cr and Si are thus tolerable at the rate of 3.0% at most each, if a very high electrical resistivity is desired, but the addition of V is mainly preferred for obtaining the increase in electrical resistivity since the addition is accompanied by other beneficial effects, as has been said. Adding more Cr or Si would lower the saturation induction, and thus the ability of the material to have a high power-to-weight ratio, due to the decrease in the resulting concentrations of Fe and Co. But it should also be remembered that the size of electrical machines such as transformers, actuators, generators . . . is limited, in particular in the aeronautical field, by the heating due to the Joule effect and to the magnetic losses of magnetic cores. And yet, the addition of Si and/or Cr tends to reduce the magnetic losses, thus increasing the working frequencies and magnetic inductions. The power-to-weight ratio can then be increased, or the negative impact of the reduction in saturation induction can be reduced. For certain particular applications wherein the reduction of magnetic losses is of significant importance, the addition of Si and/or Cr can thus be overall advantageous.

For applications where such reduction in magnetic losses is not more particularly sought, it is recommended to limit Cr and Si to 0.1% each, which often corresponds to a simple absence of intentional addition of said elements during the production.

The concentration of Ni is comprised between traces and 5.0%, preferentially between traces and 0.1%.

Ni is a ferromagnetic element but is much less interesting than Fe and Co for the saturation magnetization Jsat and has no advantage for lowering of the magnetocrystalline anisotropy constant K1 and for increasing the resistivity. On the other hand, Ni improves the ductility which can be interesting for cold-rolling. An addition of Ni up to 5.0% is tolerated, but in many cases it will not be necessary to add Ni, and the preferred maximum content of 0.1% will often simply correspond to the Ni present in the raw materials. In addition, an absence of addition of Ni contributes to limiting the cost of the alloy.

The concentration of Mn is comprised between traces and 2.0%, preferentially between traces and 0.1%.

Mn has no particularly favorable or unfavorable properties, apart from a reduction in Jsat with no advantages which could counterbalance the reduction. Up to 2.0% can be added, but preferentially the concentration resulting from the simple melting of the raw materials will be enough, hence the preferred maximum of 0.1%.

The concentration of C is comprised between traces and 0.02%, preferentially between traces and 0.01%. The aim is thus to ensure the absence of precipitation of carbides, and especially to prevent the formation of clusters of C atoms which would degrade the magnetic properties, by trapping the Bloch walls, as the material is being used.

The concentration of S should not exceed 50 ppm (0.005%) because S tends to form, during the hot transformation, fine precipitates of sulfides such as MnS, which will be very unfavorable to the magnetic properties of the material, by increasing the coercive field Hc (and hence the losses by hysteresis) and by reducing the magnetic permeability p, thus by increasing the ampere-turns needed for the magnetization of the magnetic yoke, which goes in the direction of an increase in the heating of the windings by Joule effect and of a degradation of the efficiency of the machine. The addition of S has no favorable effect.

P tends to form phosphides (e.g. of V) which, like sulfides, are precipitates interacting with the Bloch walls (trapping), thus degrading the magnetic properties, like for S. The concentration of P is limited to at most 150 ppm (0.015%), and preferentially to at most 70 ppm (0.007%).

Mo does not bring any significant reduction in ordering, compared to V. Moreover, Mo is relatively expensive and does not carry a magnetic moment, so the addition thereof would reduce the saturation magnetization (Jsat), while increasing the price of the material. The presence thereof in the alloy is typically limited to 0.3%, and preferentially to 0.1% at most.

Like Mo, Cu is relatively expensive, not carrying a magnetic moment, and tends moreover to favor the formation of copper clusters in iron-rich matrices, which will act as precipitates on the Bloch walls, hence a degradation of the magnetic performance Hc and p. The presence of Cu is typically limited to at most 0.5% in the alloy, and preferentially to at most 0.1%, due to a judicious choice of raw materials and an absence of voluntary addition.

N and O are, like S and P, are chemical oxidants, and thus have great facilities to form non-magnetic precipitates, interacting unfavorably with Bloch walls, thus significantly degrading Hc (by increasing Hc) and p (by reducing p): the more N and O in the matrix, the greater the risk that said elements encounter, when hot, elements which can be oxidized such as Fe, Co, Mn, V, W, Ta, Zr, Nb, Ti, Ca, Mg, Al, Si, La, etc. present in the matrix either in very large quantities (Fe, Co, etc.) or as unavoidable residuals (Ca, Mg, Ti, Al, etc.). Despite the vacuum melting of the raw materials (VIM) and even the vacuum remelting (VAR) or slag remelting (ESR) of the ingot or electrode, it cannot be completely prevented that a small fraction of the metal combines with a few tens of ppm of oxidants such as O and N. The presence of, at most, 300 ppm of O and of 300 ppm of N, preferentially at most 100 ppm of O and at most 100 ppm of N, is tolerated.

Si, Mn but especially Al, Ti, Ca, Mg, or rare earths such as La, have a high affinity for oxidants such as O, N, S, and even for C, and can then form various precipitates (oxides, nitrides, sulfides, carbides) which are very degrading for the magnetic properties. Remelting operations (VAR, ESR) significantly reduce the number and the size of such precipitates, but the more elements which can be oxidized are available at the start (e.g. in an ingot resulting from a VIM treatment), the more will remain after remelting, and thus until the final stage of manufacture of the material. It is thus important to reduce the presence thereof as much as possible, at the start.

The target is thus at most 100 ppm of Al (0.01%) and preferentially at most 20 ppm of Al (0.002%), at most 100 ppm of Ti (0.01%) and preferentially at most 20 ppm of Ti (0.002%), at most 50 ppm of Ca+Mg, and preferentially at most 10 ppm of Ca+Mg. In the case of the addition of rare earths, at most 500 ppm, the target is most particularly to obtain a liquid bath with VIM with a very low chemical oxygen activity before the addition of the rare earths.

The rest of the alloy consist of Fe and impurities resulting from the melting.

It should be understood that the concentrations considered as preferred for certain elements are independent from the concentrations considered as preferred for the other elements. In other words, it is possible, without departing from the invention, to have one or a plurality of elements in the preferred range(s) thereof whereas the other elements would not be in the preferred ranges thereof, if same have one.

The composition of the alloy gives same a temperature of complete recrystallization, which is generally on the order of 700° C., whereas the beginning of recrystallization starts around 600° C. after the restoration phenomenon (which occurs at about 500-600° C.). It is necessary to know the time (which will be called "effective time", and which will be denoted by "$t_u$") during which the material remains in the recrystallization zone of the annealing furnace (in other words, in the zone where the temperature of the furnace is at least 600° C.) during the running of the strip in the annealing furnace at the speed V, and which can be measured experimentally or determined by calculation using models known to a person skilled in the art. It is considered, within the framework of the invention, that the critical recrystallization temperature Trc, from which the material starts the recrystallization thereof, is Trc=600° C. The effective length (of the furnace) for recrystallization Lu is $Lu=V\cdot t_u$ and is measured quite easily by a person skilled in the art during a temperature measurement on a running strip.

According to the invention, the starting point is a semi-finished product which has been produced (without remelting if it is desired to keep an economical method of production and the final performance of the product which are simply comparable to the performance of the usual products and not especially improved with respect to same, or with remelting if it were to obtain remarkably good final performance), cast, hot-formed and, preferentially, hyper-quenched, by conventional means, with parameters of shaping by forging and/or hot-rolling which are entirely conventional. Such steps aim to prepare a semi-finished product apt to be cold-rolled for obtaining a strip or a sheet of equi-atomic FeCo-alloy (thus containing about as much Fe as Co, both in weight percentages and in atomic percentages since the two elements, being immediate neighbors in the periodic classification of the elements, have very similar atomic masses (55.8 and 58.9 g/mol respectively), the composition of which is comparable to the composition of known equi-atomic FeCo-alloys. A hot-formed semi-finished product is thus obtained, typically in the form of a strip, with a thickness $e_{HR}$ comprised between 1.5 and 2.5 mm, typically on the order of 2 mm. Above 2.5 mm of thickness, there is a risk of no longer being able to extract heat quickly enough, even by hyper-quenching, for preventing an ultra-fast and embrittling ordering.

At the end of the hot-rolling, the strip obtained not necessarily, but very preferentially should undergo hyper-quenching. Such treatment is used for preventing to a very large extent, the order/disorder transformation in the material, so that the material remains in an almost disordered structural state, little changed compared to the structural state thereof obtained by hot-rolling at a temperature above Trc, and which, for this reason, is ductile enough to be cold-rolled.

The hyper-quenching thus allows the hot strip to be then surely cold-rolled without difficulty until the final thickness of the cold-rolling sequence, whatever the thickness thereof provided the thickness is not greater than 2.5 mm, and whatever the composition thereof provided the composition is within the limits set by the invention.

Hyper-quenching can be carried out directly at the outlet of hot-rolling, i.e. without intermediate reheating of the strip, if the temperature of the strip at the end of rolling is sufficiently high and if the hot-rolling installation makes it possible, or, otherwise, after reheating the strip to a temperature above the order/disorder transformation temperature.

In practice, since the embrittling ordering is established between 720° C. and the ambient temperature, there are two possibilities for carrying out the hyper-quenching:

- either the still hot metal, following the hot-rolling thereof, is violently cooled (typically at least 200° C./second, preferentially at least 1000° C./second, better at least 2000° C./second), e.g. with water, at the outlet of the hot-rolling plant, from a temperature of 800 to 1000° C. down to room temperature;
- or the hot-rolled and then slowly cooled, thus brittle metal is heated between 800 and 1000° C., before a violent cooling, i.e. at, at least 200° C./second, preferentially at least 1000° C./second, better at least 2000° C./second, down to room temperature.

Such a treatment is known per se to a person skilled in the art.

At the end of said sequence of operations, the metal has to be in a 100% recrystallized state, unless the total recrystallization is obtained by one additional annealing or by additional annealings which will be carried out before the sequence LAF1-R1-LAF2, said sequence being one of the main elements of the invention, as has been seen.

The hot-rolling of FeCo equiatomic alloys in the form of strips is most often carried out around 900° C., and a recrystallization at 100% or very close is then obtained during the residence of the strip in the wound state.

If the hot-rolled product is a sheet not intended to be wound, and if it is found, during preliminary testing, that 100% recrystallization is not already systematically obtained after hot-rolling, the conditions of the hot-rolling and of the associated operations thereof can be adjusted in order to obtain the 100% recrystallized state with certitude, by varying the heating time preceding the hot-rolling or by slowing down the cooling which follows the hot-rolling, e.g. by placing the sheet metal under a hood.

Starting from a hot-formed and, if appropriate, hyper-quenched product, which is recrystallized at 100% or nearly so, makes it possible to carry out afterwards, the at least two cold-rolling steps and the at least one intermediate annealing according to the invention, starting from a standardized microstructure, on which the effects of the following operations on the texturing of the material would be predictable and manageable.

After hot-rolling and, if appropriate, hyper-quenching, the metal preferentially undergoes, in a conventional manner, an operation of chemical pickling and/or mechanical descaling of the hot-rolled strip in order to prevent mill scale incrustation in the surface of the strip during subsequent rolling operations. Such operation does not affect the microstructure of the strip and hence is not an element of the invention.

A first cold-rolling LAF1 of the 100% recrystallized semi-product of initial thickness $e_{HR}$ is then carried out, in one or a plurality of passes, which destroys the initial recrystallized microstructure. Polishing can be carried out before the first pass or between two passes. The semi-finished product is thus brought to a thickness e1 less than or equal to 1 mm, preferentially less than or equal to 0.6 mm, generally comprised between 0.5 mm and 0.2 mm, typically 0.35 mm, and which can go down to 0.12 mm, which corresponds, according to the invention, to an overall reduction ratio TR1 at the first cold-rolling LAF1 comprised between 70 and 90%.

An intermediate continuous annealing R1 is then carried out on the semi-finished product, in a tunnel furnace. The intermediate annealing R1 according to the invention is necessarily carried out continuously in order to be able to obtain, at the outlet of the annealing furnace, sufficiently high forced cooling rates, i.e. of at least 600° C./hour, preferentially at least 1000° C./hour, better still at least 2000° C./hour, which can only be reached if the strip is unwound, and is thus not in the form of a coil as the strip would be, in a static annealing furnace.

The intermediate annealing R1 is carried out at a temperature such that the alloy is in a disordered ferritic phase. The above means that the temperature is comprised between the order/disorder transformation temperature of the alloy and the ferritic/austenitic transformation temperature of the alloy. For a substantially equiatomic Fe—Co alloy such as the alloys concerned by the invention, having a concentration of Co comprised between 47.0 and 51.0% by weight, the temperature of the furnace atmosphere in the effective length of the annealing furnace has to be comprised, in practice, between Trc and 950° C. Lu is the “effective length” of the furnace, i.e. the length of the path of the strip through the furnace over which the strip as such, and not just the atmosphere of the furnace, is effectively at a temperature greater than Trc. The above can lead to ignoring, for the determination of the parameters of the intermediate annealing R1 according to the invention, the portions of the furnace closest to the inlet and outlet thereof, wherein it is not certain that the effective temperature is sufficient for the passage of the strip therein to be metallurgically efficient. A person skilled in the art will know how to determine, by means of measurements and current experiments, over which length Lu, in the furnace at the disposal thereof, the temperature of the treated strip is actually higher than the temperature Trc, knowing the composition of the strip.

The atmosphere of the annealing furnace is a preferentially a reducing atmosphere, thus consisting of pure hydrogen or a hydrogen-neutral gas mixture (argon or nitrogen). A neutral atmosphere (Ar and/or nitrogen e.g.) would also be conceivable, yet having a reducing atmosphere ensures that spurious air inlets or insufficient purity of the neutral gas are not likely to cause a surface oxidation of the strip, which would be harmful for the proper execution of the subsequent cold-rolling.

The temperature of the strip in the effective length Lu of the annealing furnace is, as has been said, comprised between the starting temperature of recrystallization Trc (which can be considered, with a good approximation, as equal to 600° C., taking into account the compositions of the strip to which the invention is addressed and which are situated within a limited range) and 900° C., preferentially between 700 and 900° C., in order to obtain a partial recrystallization with more certitude, but nevertheless sufficient for all the alloy compositions concerned by the invention. The effective temperature of the furnace atmosphere has to be chosen accordingly, also taking into account the fact that the strip takes a variably long time to heat up after entering the furnace, and that the nature of said atmosphere can also affect the heating time. Pure hydrogen is the usual gas which is the most favorable from such point of view, but heat transfer in the furnace can also be improved by establishing of a forced convection regime, so that gaseous atmospheres less favorable to heat transfer than pure hydrogen, but more easily manageable from the point of view of the safety of operation of the furnace, can be used. Helium would provide even better heat transfer than hydrogen and would pose fewer safety problems, but helium is much more expensive and not reductive.

The strip has to reside in said temperature range for a duration of 15 s to 5 min. At least for the shortest durations and the highest annealing temperatures R1, the above can lead to imposing a temperature on the furnace atmosphere a little higher than 900° C., e.g. 950° C. A person skilled in the art will be able to determine experimentally, depending on the products the person processes, the running speed thereof and the precise features of the furnace thereof, which temperatures in the furnace would be suitable for the strip as such to reach a temperature according to the present invention, for a duration also according to the invention, the goal being to obtain only a partial recrystallization of the strip.

The rate of only partial recrystallization obtained following the intermediate annealing R1 has to be comprised between 10 and 50%, preferentially between 15 and 40%, better still between 10 and 30%. A too low degree or recrystallization makes intermediate annealing R1 unnecessary, whereas a too high degree or recrystallization degrades the magnetic losses of the final product.

The speed V of passage of the strip through the furnace can be adapted, taking into account the length of the furnace, so that the time of passage through the zone of homogeneous temperature of the furnace is 10 s to 10 min, and preferentially comprised between 15 s and 5 min. In any case, the residence time at a temperature comprised between Trc and 900° C. has to be greater than 15 s, better still greater than 30 s, especially if the heat transfer conditions are not optimal. For an industrial furnace with a length on the order of one meter, the speed has to be greater than 0.1 m/min. For another type of industrial furnace with a length of 30 m, the running speed has to be greater than 2 m/min, and preferentially from 7 to 40 m/min. In general, a person skilled in the art knows how to adapt the running speeds according to the length of the furnaces available thereof.

An additional condition is that the following relation is satisfied during the annealing R1 which precedes the second cold-rolling LAF2 which will be described hereinafter and which gives the strip the final thickness e2 Thereof:

$$26° \text{ C.}\cdot\text{Min}\cdot\text{m} \leq (T-CRT)\cdot Lu/V \leq 160° \text{ C.}\cdot\text{min}$$

with T and Trc in ° C., Lu in m, speed V in m/min, knowing that Trc=600° C. is a good approximation.

Preferentially, 50° C. min≤(T−Trc)·Lu/V≤160° C. min with Trc=600° C. like hereinabove.

The two inequalities are also valid for intermediate thicknesses e1 of the strip other than 0.35 mm at the time of intermediate annealing R1, such as 0.3 mm or 0.5 mm.

Indeed, surprisingly, it was found that in order to obtain low magnetic losses on the alloys used in the invention (on the order of 26.5 W/kg maximum), only partial recrystallization of the strip had to be obtained after the intermediate annealing R1, with the rate of recrystallization as mentioned hereinabove (10-50%, preferentially 15-40%, better still 15-30%), independently of the completely recrystallized structure which is aimed for after the final annealing. For this purpose, it is thus not necessary to inject an excessive quantity of heat into the strip during the intermediate annealing R1 of partial recrystallization according to the invention. There is, however, a minimum to be satisfied for the above, because otherwise, no significant partial recrystallization of the strip is obtained, and the intermediate annealing R1 is then useless: otherwise, we would then be brought back to a case comparable to the case where LAF1 and LAF2 would follow each other directly and where, consequently, there would be, in a conventional manner, only one cold-rolling carried out in a plurality of passes without the intermediate annealing of partial recrystallization R1 which is an essential element of the invention.

The inventors have e.g. succeeded in obtaining magnetic losses, at the final thickness e2 of 0.1 mm, as low as less than 26.5 W/kg at 2T/400 Hz, after a final annealing on a wound-tape toroidal core at 880° C., by running the strip at the intermediate thickness e1=0.35 mm during the intermediate annealing R1 in a furnace with an effective length (Lu) [of] 1 m at a speed V of 3 m/min, at a temperature of 800° C., for an alloy where the start of recrystallization (temperature Trc) takes place for annealings of a few minutes around 600° C., which is the case of the alloys concerned by the invention. Such an annealing corresponds to (T−Trc)·Lu/V=67° C. min, with T and Trc in ° C., Lu in m, V in m/min, thus less than 160° C. min and also greater than 50° C. min, thus corresponding to the preferred requirements of the invention. The recrystallized fraction obtained at the end of the intermediate annealing R1, measured by the EBSD (Electron Backscatter diffraction) technique, was 40%.

In another example, the inventors succeeded in obtaining magnetic losses at the final thickness of 0.1 mm, as low as less than 26.5 W/kg at 2T/400 Hz, by running the strip with the intermediate thickness e1=0.35 mm during the intermediate annealing R1 of partial recrystallization, in a furnace with effective length (Lu) of 2.3 m at a speed of 3.6 m/min at a temperature of 840° C., for an alloy where the start of recrystallization (temperature Trc) happens for annealings of a few minutes around 600° C. Such an annealing corresponds to (T−Trc)·Lu/V=153° C. min, thus here again less than 160° C. min and also greater than 50° C. min. The recrystallized fraction obtained at the end of the intermediate annealing R1, measured by the EBSD technique, was 47%.

On the other hand, the same annealing R1 of the strip, carried out at a speed of 2 m/min, leads to too extensive recrystallization, and magnetic losses greater than 26.5 W/kg are observed in the final state, for a value (T−Trc)·Lu/V=276° C.·min, thus greater than 160° C.·min. The recrystallized fraction obtained at the end of the intermediate annealing R1, measured by the EBSD technique, was 72%.

In yet another example, the inventors succeeded in obtaining magnetic losses at the final thickness e2=0.1 mm, as low as less than 26.5 W/kg at 2T/400 Hz, by running the strip with the intermediate thickness e2=0.5 mm during the intermediate annealing R1 of partial recrystallization, in a furnace with effective length (Lu) of 4 m at a speed of 7 m/min at a temperature of 860° C., for an alloy where the start of recrystallization happens for annealings of a few minutes around 600° C. (Trc). Such an annealing corresponds to (T−Trc)·Lu/V=149° C. min, thus less than 160° C. min and also greater than 50° C.·min. The recrystallized fraction obtained at the end of the intermediate annealing R1, measured by the EBSD technique, was 25%.

It should be noted that the continuous treatment furnace used can be of any type. In particular, the furnace can be a conventional resistance furnace or else a heat radiation furnace, a Joule effect annealing furnace, a fluidized bed annealing installation, or any other type of furnace.

At the outlet of the furnace, the strip has to be cooled at a sufficiently high rate so as to prevent a total order-to-disorder transformation during cooling. However, the inventors were surprised to find that, contrary to what happens with a hot-rolled strip of about 2 mm thickness which has to be, in the vast majority of cases, hyper-quenched in order to be subsequently able to be cold-rolled without difficulty, a cold-rolled strip of small thickness (0.12To 0.6 mm), intended to be subsequently cold-rolled again, undergoes only a slight partial ordering, to the point that the low degree of brittleness reached does not require the hyper-quenching as mentioned above, and which is carried out, very preferentially, after the hot-rolling.

The inventors were surprised to find that, after a continuous intermediate annealing as described above, the ability of the strip to be cold-rolled and cut (by shearing, in particular) becomes very good provided the disorder/order transformation is not total. The above means, unexpectedly, that such a strip can be cold-rolled again despite a partial ordering which generates a certain degree of brittleness.

For the disorder/order transformation not to be total, the cooling rate above 200° C. has to be at least 600° C./hour, preferentially at least 1000° C./hour and more preferentially at least 2000° C./hour. A cooling by forced convection or a spraying of cooling fluid is thus, in practice, necessary for reaching the desired minimum rate. When the temperature of the strip has fallen to 200° C., the order/disorder transformation no longer changes substantially, and the cooling rate between 200° C. and the ambient temperature is no longer important from such point of view.

The cooling rate can be as high as is theoretically possible given the thickness of the strip and the cooling means available. However, practically it is not useful to exceed 50,000° C./hour. A rate of between 2000° C./hour and 10,000° C./hour is usually sufficient, and forced convection is usually sufficient to obtain such rate.

In addition, the annealing performed before the last cold-rolling (namely the intermediate annealing R1) will have (for the first inequality) and could (for the second inequality) satisfy the following two inequalities, depending upon the temperature of the strip T in ° C., the effective length of the furnace Lu (length over which the temperature T of the plateau or the maximum temperature of the furnace is above the start temperature Trc of the recrystallization of the strip for annealings of a few minutes, temperature Trc which is taken to be equal to 600° C. with a good approximation for all the alloys concerned by the invention) in m, the speed V of the strip in m/min:

$$26° \text{ C.}\cdot\text{min} \leq (T-Trc)\cdot Lu/V \leq 160° \text{ C.}\cdot\text{min}$$

and, preferentially $50° \text{ C.}\cdot\text{min} \leq (T-Trc)\cdot Lu/V \leq 160° \text{ C.}\cdot\text{min}$.

The reasons for the above will be discussed hereinafter.

Then, after the continuous intermediate R1, a second cold-rolling sequence LAF2 is carried out in one or a plurality of passes, which typically gives the strip a thickness e2 comprised between 0.05 and 0.25 mm, preferentially between 0.07 and 0.20 mm. e2 is, in general, the intended final thickness for the cold-rolled strip. The reduction rate TR2 of the second cold-rolling LAF2 is, according to the invention, comprised between 60 and 80%, preferentially between 65 and 75%.

If the case of two cold-rolling operations LAF1 and LAF2 and an intermediate annealing R1, with the sequence LAF1-R1-LAF2 following the hot-rolling and preceding the final static annealing Rf, is the typical preferred case of the invention, a greater number of cold-rolling and intermediate annealing operations can be provided, in addition to LAF1, R1 and LAF2 being performed as described above. Such additional cold-rolling and intermediate annealing operations can be denoted by LAFi and R1, respectively, and are carried out starting from the hot-rolled and cooled semi-finished product according to the invention. Hence, all above operations have to precede the sequence LAF1-R1-LAF2 which is mandatory in the invention, and the semi-product has to be 100% recrystallized after the last of the annealings R1, so as to start the sequence LAF1-R1-LAF2 according to the invention on a 100% recrystallized microstructure, for the reasons given hereinabove in relation to the case where cold-rolling(s) and annealing(s) are not carried out before said sequence.

There may be only one additional cycle LAF1-R1 with respect to the most usual case of a sequence of operations LAF1-R1-LAF2, but it should be understood that the invention extends to cases where there are a plurality of such additional cycles LAF1-R1-LAF2 which are added to LAF1-R1-LAF2 and all being carried out before LAF1. In any case, the annealing R1 carried out before the last cold-rolling LAF2 has to be carried out, depending upon the maximum temperature of the strip T, of the effective length of the furnace Lu (length over which the temperature T of the plateau or maximum temperature of the furnace is above the temperature Trc, the start temperature of recrystallization of the strip for annealings of a few minutes, herein 600° C.), with a strip speed V (in m/min) such that:

$$26° \text{ C.}\cdot\text{min} \leq (T-Trc)\cdot Lu/V \leq 160° \text{ C.}\cdot\text{min}$$

preferentially, $50° \text{ C.}\cdot\text{min} \leq (T-Trc)\cdot Lu/V \leq 160° \text{ C.}\cdot\text{min}$.

An example of such a process, including two additional cycles LAFi-R1, would be, still starting from the hot-formed strip with a thickness $e_{HR}$ of 2 mm of the previous example, to first perform a first cold-rolling LAFi-no. 1 at a rate TR(i=1) of at least 40%, for obtaining a strip thickness ei-no. 1 of at most 1.2 mm, then a first continuous intermediate annealing R1-no. 1, for which it is necessary that the passage time in the effective zone of the furnace, where a temperature of between Trc and 900° C. is imposed on the strip, is from 10 s to 10 min, and preferentially between 15 s and 5 min, better still between 30 s and 5 min, and in any case so that the metal is preferentially 100% recrystallized, so as to better ensure that after the last intermediate annealing, and thus before LAF1, the sheet or strip can be completely recrystallized as required by the invention. The intermediate annealing R1-no. 1 is followed by cooling at a rate greater than 600° C. per hour, and preferentially greater than 1000° C. per hour or even than 2000° C./hour. In practice, it is not useful to exceed 10,000° C./hour and a rate between 2000° C./hour and 3000° C./hour is generally sufficient. In general, when cold-rolling is to be carried out after a continuous intermediate annealing (R1 or R1), such rapid cooling has to be carried out, for the reasons given hereinabove, related to the ability of the strip to be cold-rolled again, and also to the aptitude thereof to be cut, if such aptitude is useful.

A second cold-rolling LAFi-no. 2 is then carried out with a rate TRi-no. 2 of at least 40% down to a thickness ei-no. 2 of at most 0.96 mm, followed by a second intermediate annealing R1-no. 2 followed by cooling at a rate greater than 600° C. per hour, and preferentially, greater than 1000° C./hour, or even than 2000° C./hour. In practice, it is not useful to exceed 10,000° C./hour and a rate between 2000° C./hour and 3000° C./hour is generally sufficient. The annealing R1-no. 2 is characterized by the fact that the passage time in the effective zone of the furnace, where a temperature between Trc and 900° C. is imposed on the strip, is 10 s to 10 min, and preferentially comprised between 15 s and 5 min, better still between 30 s and 5 min, and also by the fact that the metal is 100% recrystallized after the annealing R1-no. 2.

At the above stage, the typical and mandatory steps of the invention follow: LAF1-R1-LAF2 and Rf.

The first cold-rolling LAF1 is carried out, which has to be between 70 and 90%, which is chosen herein at 80%, which leads to a thickness of the strip e1 of, at most, 0.19 mm. The recrystallized 100% microstructure derived from R1-No. 2 is thus destroyed.

Partial recrystallization annealing R1 is then carried out, followed by cooling at a rate greater than 600° C. per hour, and preferentially greater than 1000° C./hour, or even 2000° C./hour. In practice, it is not useful to exceed 10,000° C./hour and a rate between 2000° C./hour and 3000° C./hour is generally sufficient. The annealing R1 is characterized by the running of a strip with an intermediate thickness e1=0.19 mm at most, in a furnace with an effective length of 4 m (Lu) at a speed of 12 m/min, at a temperature of 820° C., for an alloy where the start of recrystallization takes place for annealings of a few minutes at around 600° C. (Trc, in other words). Such an annealing corresponds to $(T-Trc)\cdot Lu/V=73.3°$ C.·min, thus less than 160° C.·min and also more than 50° C.·min. Hence, same satisfies the aforementioned necessary conditions for the annealing R1 preceding the last cold-rolling.

The cold-rolling LAF2 is then carried out, which is the fourth cold-rolling in said example. LAF2 should have a reduction ratio between 60 and 80%, and herein 70% is chosen, which produces a strip with a final thickness e2 of, at most, 0.06 mm.

Finally, a final static Rf annealing of total recrystallization is carried out, typically between 850 and 890° C. in a reducing atmosphere for several hours, e.g. at 880° C. in pure hydrogen for 3 h, followed by cooling at a rate of 100 to 500° C./hour, preferentially between 200 and 300° C./hour, so as to strongly decrease or cancel the magnetocrystalline anisotropy constant K1.

Thus, it might be completely sufficient to carry out only two cold-rolling sequences, with an intermediate annealing R1 (partial recrystallization) ending with a rapid cooling (at least 600° C./hour as explained hereinabove), and with a distribution of the reduction ratios TR between the two cold-rolling operations which has been previously indicated and which leads to the desired final thickness, before the final static annealing of total recrystallization Rf which will be detailed hereinafter.

On the other hand, as has been said, it would be conceivable to carry out, before Rf, more than two cold-rolling sequences (four in the previous example), with the associated intermediate annealings and rapid coolings, again by suitably distributing the respective reduction rates of the cold-rollings. But, at least economically, it is clear that there is an interest in not multiplying the cold-rolling and annealing sequences beyond what would be necessary according to experience, and that the minimum of two very specific cold-rolling sequences LAF1 and LAF2, due to respective, narrow ranges of reduction ratios TR1 and TR2, separated by a no less specific continuous intermediate annealing with partial recrystallization R1 followed by rapid cooling, also represents the preferred case, LAF1 being carried out on a hot-rolled semi-finished product which is completely recrystallized and, if appropriate, hyper-quenched.

It should be understood that the conditions:

$$26° \text{ C.·min} \leq (T-Trc)\cdot Lu/V \leq 160° \text{ C.·min, with } Trc \text{ equal to } 600° \text{ C.;}$$

$$\text{preferentially } 50° \text{ C.·min} \leq (T-Trc)\cdot Lu/V \leq 160° \text{ C.·min;}$$

are the conditions which have to be met by the continuous annealing R1 preceding the last cold-rolling LAF2.

On the other hand, such conditions do not necessarily need to be satisfied by the additional intermediate annealings R1, if any, since in such case it is only imperative that the recrystallization be complete after the last additional annealing R1. It is only a preference that the recrystallization is total after the other, if any, additional annealings R1. For such annealings, when carried out, it is necessary that the passage time in the effective zone of the furnace, where a temperature between Trc and 900° C. is imposed on the strip, is preferentially comprised between 10 s and 10 min, and preferentially comprised between 15 s and 5 min, better still between 30 s and 5 min.

What is needed is to have a 100% recrystallized state just before LAF1 (hence after the last additional annealing R1).

As examples, the following schemes can be mentioned of a succession of manufacturing steps comprising a plurality of intermediate annealings R1 and which would be according to the invention.

EXAMPLE 1, WITH TWO INTERMEDIATE ANNEALINGS R1

Hot-rolling down to a thickness $e_{HR}$ of 2 mm—LAFi-no. 1 at 50% of reduction rate down to a thickness of 1 mm—R1-no. 1 up to a degree or recrystallization of 100%—LAFi-no. 2 at 50% of reduction rate down to a thickness of 0.5 mm—R1-no. 2 up to a degree or recrystallization of 100%—LAF1 at 70% of reduction rate down to a thickness e1 of 0.15 mm—R1 up to a degree or recrystallization of 10 to 40%—LAF2 at 66% reduction rate down to a thickness e2 of 0.06 mm—static Rf at 850° C. for 3 h under hydrogen, providing total recrystallization.

EXAMPLE 2, WITH THREE INTERMEDIATE ANNEALINGS R1

Hot-rolling down to a thickness $e_{HR}$ of 2.5 mm—LAFi-no. 1 at 40% of reduction rate down to a thickness of 1.5 mm—R1-no. 1 up to a degree or recrystallization of 100%—LAFi-no. 2 at 40% reduction rate down to a thickness of 0.9 mm—R1-no. 2 up to a degree or recrystallization of 100%—LAFi-no. 3 to 44% reduction rate down to a thickness of 0.5 mm—R1-no. 3 up to a degree or recrystallization of 100%—LAF1 to 70% reduction rate down to a thickness e1 of 0.15 mm—R1 up to a degree or recrystallization from 10 to 40%—LAF2 at 66% reduction rate down to a thickness e2 of 0.06 mm—static Rf at 850° C. for 3 h under hydrogen providing total recrystallization.

EXAMPLE 3, WITH TWO INTERMEDIATE ANNEALINGS R1

Hot-rolling down to a thickness $e_{HR}$ of 1.5 mm—LAFi-no. 1 at 40% of reduction rate down to a thickness of 0.9 mm—R1-no. 1 up to a degree or recrystallization of 100%—LAFi-no. 2 at 44% of reduction rate down to a thickness of 0.5 mm—R1-no. 2 up to a degree or recrystallization of 100%—LAF1 at 70% of reduction rate down to a thickness e1 of 0.15 mm—R1 up to a degree or recrystallization of 10 to 40%—LAF2 at 66% of reduction rate down to a thickness e2 of 0.06 mm—static Rf at 850° C. for 3 h under hydrogen, providing total recrystallization.

EXAMPLE 4 WITH INTERMEDIATE ANNEALING R1

Hot-rolling down to a thickness $e_{HR}$ of 1.59 mm—LAFi-no. 1 at 40% of reduction rate down to a thickness of 0.95 mm—R1-no. 1 up to a degree or recrystallization of 100%—LAF1 at 70% of reduction rate down to a thickness e1 of 0.29 mm—R1 up to a degree or recrystallization of 10 to 40%—LAF2 at 65% of reduction rate down to an e2 Thickness of 0.1 mm—static Rf at 870° C. for 2 h under hydrogen, providing total recrystallization.

In all cases (two or more LAF cold-rolling sequences), the material which has reached the final thickness, undergoes a final static annealing Rf on strip, or on pre-cut and shaped parts (wound-tape toroidal cores for transformers, rotors and actuator stators), so as to, this time, completely recrystallize the strip and amply develop the growth of ferritic grain, without ever entering the austenitic range. Such sufficient growth of the ferritic grain, which leads to obtaining low magnetic losses, cannot be obtained by a continuous annealing which would be too brief for such purpose.

Thus, a static annealing Rf is applied for typically more than 30 minutes, preferentially more than 1 hour, at a temperature between 750 and 900° C., preferentially between 800 and 900° C., and better still between 850 and 880° C., either under vacuum or under a non-oxidizing protective atmosphere, thus neutral or reducing, e.g. under nitrogen, under a nitrogen-hydrogen or argon-hydrogen mixture, under an inert gas such as argon, and preferentially under pure hydrogen.

The cooling which follows the final annealing Rf can be carried out at any rate, but preferentially between 100° C./hour and 500° C./hour, and better still between 200 and 300° C./hour.

The reasons for such limitations are that the purpose of the cooling is to optimize the magnetocrystalline anisotropy constant K1, and that:

For a slow cooling, a positive value K1 corresponding to an ordered alloy is obtained;

For very rapid cooling, a negative value K1 corresponding to a disordered alloy is obtained.

The optimum magnetic properties are obtained for a K1 equal to zero, hence for optimized cooling rates situated in the aforementioned range, and thus the most typically around 250° C./hour.

The following experiments were carried out and demonstrate the advantages of the invention.

Table 3 shows the compositions of the five alloys used, given in percentages by weight. Alloys 1 and 4 were produced with only one remelting, from new and thus expensive raw materials. The other alloys, 2 (which is the alloy denoted by "Ref 1" in Table 1 and the composition of which is as per the composition which can be used in the present invention), 3 and 5 were produced without remelting, from ordinary raw materials, thus at as moderate a cost as possible. As a result, the concentrations of Mn, S, Ni, Cu, Nb in the alloy 1, which result from the melting of the raw materials and from the conditions of production of the liquid metal and not from the addition of said elements, are lower than the concentrations of the same elements in the other alloys and show that raw materials of very good purity were used in the case of said alloy. All the alloys have compositions as per what the invention requires. The elements not explicitly mentioned are present, at most, only in the form of impurities without metallurgical effect. As well, the Trc recrystallization start temperatures thereof have been indicated, said being involved in determining the intermediate annealing R1 parameters preceding the last cold-rolling LAF2: as has been said, the temperatures are all very close to 600° C., as is the case for alloys with the general composition used in the invention.

TABLE 3

Compositions of the alloys of the experiments

| | Alloy 1 (remelting) | Alloy 2 (without remelting) | Alloy 3 (without remelting) | Alloy 4 (remelting) | Alloy 5 (without remelting) |
|---|---|---|---|---|---|
| C % | 0.002 | 0.007 | 0.005 | 0.006 | 0.007 |
| Mn % | 0.011 | 0.034 | 0.055 | 0.040 | 0.048 |
| Si % | 0.017 | 0.020 | 0.074 | 0.050 | 0.07 |
| S % | 0.0013 | 0.0035 | 0.0039 | 0.0028 | 0.0035 |
| P % | 0.0048 | 0.0032 | 0.0067 | 0.0056 | 0.0069 |
| Ni % | 0.03 | 0.15 | 0.13 | 0.05 | 0.13 |
| Cr % | 0.011 | 0.017 | 0.028 | 0.023 | 0.035 |
| Mo % | <0.005 | <0.005 | <0.005 | <0.005 | <0.005 |
| Cu % | 0.0032 | 0.006 | 0.011 | 0.008 | 0.012 |

TABLE 3-continued

Compositions of the alloys of the experiments

| | Alloy 1 (remelting) | Alloy 2 (without remelting) | Alloy 3 (without remelting) | Alloy 4 (remelting) | Alloy 5 (without remelting) |
|---|---|---|---|---|---|
| Co % | 48.84 | 48.71 | 48.38 | 49.06 | 48.46 |
| V % | 1.90 | 1.97 | 2.00 | 2.04 | 2.00 |
| Nb % | <0.005 | 0.041 | 0.039 | 0.014 | 0.040 |
| Fe % | 49.1 | 48.8 | 49.1 | 48.7 | 49.0 |
| N % | 0.0057 | 0.0032 | 0.0031 | 0.0044 | 0.0031 |
| Al % | 0.0007 | <0.001 | <0.001 | <0.001 | 0.0016 |
| Ti % | 0.0001 | <0.001 | <0.001 | <0.001 | <0.001 |
| W % | <0.01 | <0.01 | <0.01 | <0.01 | <0.01 |
| B % | 0.0002 | 0.0006 | 0.0005 | 0.0012 | 0.0008 |
| Zr % | <0.0001 | <0.0001 | <0.0001 | <0.0001 | <0.0001 |
| Ta % | <0.0001 | <0.0001 | <0.0001 | <0.0001 | <0.0001 |
| O % | 0.0028 | 0.0041 | 0.0053 | 0.0036 | 0.0027 |
| Ca % | 0.0002 | <0.0001 | <0.0001 | <0.0001 | <0.0001 |
| Mg % | <0.0001 | <0.0001 | <0.0001 | <0.0001 | <0.0001 |
| Trc (° C.) | 600 | 600 | 600 | 600 | 600 |

The ingots (dimensions 200×500×2500 mm) made of the alloys, were hot-rolled and then hyper-quenched. Experience shows that, without hyper-quenching, the strips are at high risk of breaking during cold-rolling if cold-rolling is carried out on products with an initial thickness of more than 2 mm.

To this end, the products were successively subject to a heating between 800 and 1200° C., blooming in the form of bars with a cross-section of 100×350 mm and a few m long, then hot-machining and a very slow cooling. A very slow heating (16 h) to 1200° C. then took place, followed by hot-rolling on a strip mill, which changed the thickness of the product from 100 to 2 mm, in 16 successive passes. At the end of the last pass ending at 950° C., a hyper-quenching under a water jet at a speed on the order of 1000° C./second, and then a cold-winding of the hot strip thus obtained, were carried out.

The microstructure of the strip is 100% recrystallized and is a mixture of primary ferrite and martensite quenching from the austenitic phase (which was in equilibrium with the primary ferrite at 950° C.), a mixture to which conversion secondary ferrite, formed from austenite, is added.

The hot strips afterwards underwent either a single cold-rolling or a double cold-rolling LAF1 and LAF2 with intermediate annealing R1, so as to obtain cold strips.

Finally, the cold strips underwent a final static annealing Rf under pure hydrogen, followed by a forced cooling at 250° C./hour.

The parameters and the results of the experiments carried out on alloys 1 to 5 of Table 3, proving the interest of the invention, are summarized in Table 4. The intermediate annealings were carried out in a furnace with an effective heating length of 2.3 m.

TABLE 4

Results of the tests according to the invention and of the comparative tests

| Alloy | Remelting | LAF and LAF rate | Measurement sample | Continuous intermediate annealing R1: T and V | (T-Trc) · Lu/V. (° C. min) e2 = 0.35 mm Trc = 600° C. Lu = 2.3 m. | Final static annealing Rf pure $H_2$ + cooling 250° C./h. | Hc (Oe) | Losses at 2 T/400 Hz on washers (W/kg) | 2 T/400 Hz losses on wound-tape toroidal core (W/kg) | Reduced losses due to a double LAF |
|---|---|---|---|---|---|---|---|---|---|---|
| Alloy 1 | yes | Single 95% | Tape-wound toroidal core Ø 30 × 20-H10 mm | — | Not relevant | 880° C., 3 h | 0.41 | 20.4 | 21.6 | |

TABLE 4-continued

Results of the tests according to the invention and of the comparative tests

| Alloy | Remelting | LAF and LAF rate | Measurement sample | Continuous intermediate annealing R1: T and V | (T-Trc) · Lu/V. (° C. min) e2 = 0.35 mm Trc = 600° C. Lu = 2.3 m. | Final static annealing Rf pure $H_2$ + cooling 250° C./h. | Hc (Oe) | Losses at 2 T/ 400 Hz on washers (W/kg) | 2 T/400 Hz losses on wound-tape toroidal core (W/kg) | Reduced losses due to a double LAF |
|---|---|---|---|---|---|---|---|---|---|---|
| Alloy 2 | no | Single 95% | Tape-wound toroidal core Ø 30 × 20-H10 mm | — | Not relevant | 850° C., 3 h | 0.65 | 29.4 | 31.2 | |
| | | Double 82.5% + 71% | Washers Ø 36 × 25 mm | 840° C. at 3.4 m/min. | 162.5 (hence >160) | | 0.62 | 27 | 28.5 | |
| | | | Washers Ø 36 × 25 mm | 840° C. at 3.6 m/min. | 153 (hence <160) | | 0.58 | 25.8 | 27.3 | |
| | | | Washers Ø 36 × 25 mm | 840° C. at 3.6 m/min. | 153 (hence <160) | 880° C., 3 h | 0.49 | 23.2 | 24.8 | |
| Alloy 3 | no | Double 82.5 + 71% | Washers Ø 36 × 25 mm | 840° C. at 4.4 m/min. | 125 (hence <160) | 850° C., 3 h | 0.53 | 24.5 | 26.3 | |
| | | | Washers Ø 36 × 25 mm | 840° C. at 4.4 m/min. | 125 (hence <160) | 880° C., 3 h | 0.46 | 21.8 | 29.3 | |
| Alloy 4 | yes | Single 95% | Washers Ø 36 × 25 mm | — | Not relevant | 850° C., 4 h | 0.58 | 22.0 | 23.5 | |
| | yes | Single 95% | Tape-wound toroidal core Ø 30 × 20-H10 mm | — | Not relevant | 860° C., 2 h | 0.39 | 19.2 | 19.8 | |
| Alloy 5 | no | Single 95% | Washers Ø 36 × 25 mm | — | Not relevant | 850° C., 3 h | 0.69 | 27.4 | 29.3 | |
| | | Double: 82.5 + 71% | Washers Ø 36 × 25 mm | 840° C. at 13 m/min. | 42 (hence <160) | 850° C., 3 h | 1.2 | 26.3 | 28.2 | −4% |
| | | Double: 82.5 + 71% | Washers Ø 36 × 25 mm | 840° C. at 4.2 m/min. | 131 (hence <160) | 850° C., 3 h | 0.56 | 25.1 | 26.9 | −8% |

The example of the first two lines of the table relating to alloy 5 shows the favorable contribution (which is herein sufficient on the washers but insufficient on the toroidal core for a (T−Trc)·Lu/V of 42° C.·min) of a double cold-rolling process compared to a single cold-rolling process. The third row of the table, which corresponds to a value of (T−Trc)·Lu/V lying in the preferred range 50-160° C.·min, shows the additional advantage of being placed in the preferred range for further reducing the magnetic losses, herein by an additional 4%.

Tests with single rolling, whether there was a remelting or not, are considered as reference tests. More particularly, the tests carried out on the alloy 1 with single rolling and an ingot which underwent ESR, are typical of transformer core materials, where losses less than or equal to 26.5 W/kg at 2T and 400 Hz are desired, and obtained in the present case at the cost of performing a costly remelting. The test carried out on the alloy 2 which was not remelted, but with a single cold-rolling is typical of a material intended for rotors of rotating machines. Since same do not involve any intermediate annealing, the relation (T−Trc)·Lu/V is meaningless in the case thereof, hence the expression "irrelevant" in the corresponding boxes in Table 4.

It is also interesting to note, with regard to the tests carried out on the alloy 2, that an increase in the running speed in the annealing furnace, from 3.4 m/min to 3.6 m/min reduces losses at 2T/400 Hz, to the point that on washers, there is a change from a value of 27 W/kg which is considered to be almost acceptable but still too high, to a value of 25.8 W/kg which is considered to be suitable. The reason for the above is that such acceleration of the running speed changed the value of (T−Trc)·Lu/V to below the 160° C.·min which are the maximum required by the invention. The above clearly shows that it is relevant to consider said parameter.

The examples presented show that, even with alloys which are not particularly pure due to the absence of remelting and a choice of raw materials which is not particularly careful, carrying out a double cold-rolling with intermediate annealing, if the precise conditions of the invention are satisfied, leads to keeping low magnetic losses after a final annealing carried out under conventional conditions (850° C., 3 h, or better still 880° C., 3 h or 860° C., 2 h). Thereby, for electrical engineering applications of all types, requiring both a high power-to-weight ratio (which can be achieved with FeCo equiatomic alloys) and low magnetic losses at 2T, 400 Hz, on the order of 26.5 W/kg, or even lower for the most demanding applications in this regard, it turns out that the invention leads to obtaining such results without necessarily involving the costly operations of selecting high purity raw materials and ingot ESR or VAR.

An explanation for such de facto state could be the following, given the experiences which will be described.

Non-remelted ingots with the compositions Alloy 2, Alloy 3 and Alloy 5 of Table 3 were used, to which a heat transformation of the ingot by blooming between 1100 and 1200° C. was conventionally applied, followed by a hot-rolling between 1000 and 1200° C. on strip mills down to a thickness of 2 mm, then hyper-quenching at about 900° C. at the outlet of hot-rolling with a cooling rate of 1000° C./second, before cold-rolling same down to a thickness of 0.1 mm, either by a single cold-rolling with a reduction rate of 95%, or by a double cold-rolling down to the thickness 0.35 mm (reduction rate of 82.5%) then to the thickness 0.1 mm (reduction rate of 71.4%), thus also with an overall reduction rate of 95%, with an intermediate annealing at 84° C. for a strip speed of 3.6 m/mm for alloy 2, of 4.4 m/min for alloy 3, of 4.2 m/min for alloy 5 in a furnace with a homogeneous effective heating length of Lu of 2.3 m. The three cases are described in Table 4, and all can be used for obtaining magnetic losses at 2T/400 Hz less than 26.5 W/kg It appeared that, all else being equal, the double cold-rolling (LAF1 and LAF2) and the intermediate annealing R1 gave the strip in the strain-hardened state, a substantially modified texture. And the significant texture difference remains, without any significant change, after the final annealing of complete Rf recrystallization carried out under the conditions prescribed by the invention. Table 5 shows the volume fraction (in %) of the texture component {hkl}<uvw> calculated with a maximum dispersion of 15° over the three Euler angles, with respect to the ideal orientation, in the cases where the cold-rolled strip is simply in the strain-hardened state or is in the fully recrystallized state after a final annealing of 850° C. for 3 h. For an intermediate annealing, the effective length Lu of the furnace is 2.3 m.

TABLE 5

Volume fraction (in %) of texture component {hkl}<uvw> calculated with a maximum dispersion of 15° over the three Euler angles, with respect to the ideal orientation for different tests

| Alloy number and conditions of intermediate annealing, if appropriate | LAF | Metallurgical State | Volume fraction (in %) of texture component {hkl}<uvw> calculated with a maximum dispersion of 15° over the three Euler angles, with respect to the ideal orientation | | |
|---|---|---|---|---|---|
| | | | A = {001}<110> | B = {111}<112> | C = {111}<110> |
| 5 | single | strain-hardened | 25.0 | 8.0 | 9.0 |
| 2<br>V = 3.6 m/minute<br>(T-Trc)Lu/V = 153° C. min | double | strain-hardened | 13.6 | 11.5 | 8.0 |
| 5<br>V = 4.2 m/minute<br>(T-Trc)Lu/V = 131° C. min | double | strain-hardened | 13.8 | 13.6 | 7.5 |
| 3<br>V = 4.4 m/minute<br>(T-Trc)Lu/V = 125° C. min | double | strain-hardened | 12.2 | 13.3 | 7.8 |
| 5 | single | annealing | 40.0 | 6.0 | 5.0 |
| 2<br>V = 3.6 m/minute<br>(T-Trc) Lu/V = 153° C. min | double | annealing | 14.0 | 11.0 | 7.0 |
| 5<br>V = 4.2 m/minute<br>(T-Trc)Lu/V = 131° C. min | double | annealing | 10.3 | 15.0 | 7.6 |
| 3<br>V = 4.4 m/minute<br>(T-Trc) Lu/V = 125° C. min | double | annealing | 10.0 | 16.5 | 8.4 |
| 3<br>V = 13 m/minute<br>(T-Trc)Lu/V = 42° C. min | double | annealing | 9.0 | 12.0 | 9.3 |

Given such results, it is clear that in the strain-hardened state after a single cold-rolling, the component A of the texture is significantly stronger, typically twice as strong, than the other main components B and C of the texture. On the other hand, after the double cold-rolling according to the invention, the three components have amplitudes close to each other, between about 8 and 14%. The above is observed on the three series of tests.

On the test during which a final annealing was carried out after a single cold-rolling, component A is even more predominant than in the strain-hardened state (40% versus 25%), and is about 8 times stronger than components B and C. On the other hand, with the double cold-rolling and the intermediate annealing according to the invention, the ratios between the components A, B and C are almost unaffected compared to what the ratios were in the strain-hardened state, and the amplitudes of the components remain close, or even very close, to each other (between 7 and 16% each), and component A is no longer necessarily predominant.

Such results show that the metallurgical process (double cold-rolling range, with intermediate annealing leading to partial recrystallization) of the invention can, moreover, be clearly identified on the final product (after a final annealing completing the recrystallization, typically carried out at 850° C. for 3 hours) by the quantified characterization of the main texture components, without any ambiguity.

Indeed, the case of the invention corresponds to the fact that, after the final annealing Rf, the texture of the microstructure of the material, characterized by EBSD, is as follows:

8 to 20%, preferentially 9 to 20%, by surface area or by volume, of component {001}<110> disoriented by 15° at most (component A of Table 5);

8 to 25%, preferentially 9 to 20%, by surface area or by volume, of component {111}<112> disoriented by 15° at most (component B of Table 5);

5 to 15%, preferentially 6 to 11%, by surface area or by volume, of component {111}<110> disoriented by 15° at most (component C of Table 5);

the remainder of the material consisting of other texture components, disoriented by 15° at most, each representing at most 15% by surface area or by volume, the overlap of said other texture components with any of the {001}<110>, {111}<112> and {111}<110> components, not exceeding 10% of the surface area or volume of any of the three components.

It should be noted that because of the disorientation of each texture component identified around the crystallographic orientation {hkl}<uvw> thereof, such as 15°, two different crystallographic components can partially overlap (see e.g. references [1] to [5] cited hereinafter). So, if we find that a given texture component X represents a proportion close to (but less than) 15% of the material, it is possible that a part of the 15% actually comes from one of the main components A, B, C which has a part of the crystallographic orientations thereof in common.

If it is desired to distinguish well the orientations or texture components A, B or C from the rest of the crystallographic orientations or minor texture components X, and thus unambiguously link the proportions of the components A, B, C to the advantageous magnetic properties of the invention, it is necessary to be able to separate the representative components A, B or C from the other minor components X with sufficient precision, and thus to define a criterion of low overlap between the 2 Types of components.

Detailed crystallographic analyses, known to a person skilled in the art, such as typically the well-known EBSD technique (references [6] and [7] cited hereinafter) can be used for identifying each of the texture components which clearly differ from the random distribution, and for determining the extent of the possible overlaps between components. In the invention we define that the overlap of crystallographic orientations between one of the components A, B or C on the one hand and a minor component of texture X on the other hand, should not exceed 10% of the fraction of surface area or volume.

E.g., if next to the component A-{100}<011> disoriented by 15° around the ideal component (100)[001], it is sought to identify a component X-{hkl}<uvw> with a quite close disorientation, such as e.g. X1-{210}<011> disoriented by 15° around the ideal component (210)[001] which forms an angle of 26.56° with respect to (100)[001] (there is thus an overlap since 26.56°<2×15°), the overlap of the crystallographic orientations surface or volume fractions of A and X1 should not exceed 10% of the total surface or volume fraction. If in the present case of example of X1 and A, there is an excess of 10% in overlap, then a component X2 will be chosen a little further from A and satisfying the criterion of <10%, such as e.g. X2-{320}<011> disoriented by 15° around the ideal component (320)[001] which forms an angle of 33.69 degrees with respect to (100)[001].

Useful bibliographic references for a good understanding of the notions and methods which have just been mentioned are, in particular:

[1] Norbert Broll, «Caractérisation de solides cristallises par diffraction X», Techniques de l'Ingénieur P 1 080
[2] A. Guinier, «Théorie et technique de la radiocristallographie», 1956 Dunod, Paris
[3] H. J. Bunge, «Texture analysis in material science», 1982 Butterworths Publ. London
[4] B. Jouffrey et R. A. Portier, «Diffraction dans les métaux et alliages: conditions de diffraction», Techniques de l'Ingénieur M 4 126
[5] H. J. Bunge et C. Esling, «Texture et anisotropie des matériaux» Techniques de l'Ingénieur, M 605-1
[6] T. Baudin, «Analyse EBSD—Principe et cartographies d'orientations», Techniques de l'Ingênieur M 3040 (2010)
[7] T. Baudin et al., «Analyse des textures cristallographiques et des microstructures», Reflets de la Physique no. 44-45, p. 80 (http://dx.doi.org/10.1051/refdp/20154445080).

The three texture components considered are the components which are the most characteristic of the invention, as same are the most sensitive to the change from a single cold-rolling to a double cold-rolling and are typically the components which have the highest proportions in the final product.

Tests were carried out using the alloy 2, with a composition given in Table 3, using the same procedure as in the previous tests. Said alloy underwent the following treatment:

Casting without VAR of an ingot with a cross-section of 200×800 mm$^2$;

Hot-rolling of the ingot at a temperature from 950 to 1200° C. followed by a cooling (hyper-quenching) at a rate of about 1000° C./second, for obtaining a hot strip with thickness $e_{HR}$ [of] 2.0 mm, 100% recrystallized;

LAF1 cold-rolling of said hyper-quenched hot strip, at a reduction rate of 83%, for obtaining a cold strip with a thickness e1 [of] 0.35 mm;

Intermediate annealing R1 of partial recrystallization carried out continuously under pure hydrogen at a temperature between 760 and 810° C., in an oven with an effective length Lu of 2.3 m, wherein the strip travels at a variable speed V depending on the tests (between 2.3 and 6.5 m/min), the temperature T in the effective zone being also variable depending on the tests, so that the effects of the quantity (T−Trc)·Lu/V on the magnetic losses at 2T and 400 Hz, after the final annealing Rf as well as the degree or recrystallization after R1, as measured by the EBSD (Electron Back Scattered Diffraction) method can be evaluated; the annealing R1 being followed by cooling down to room temperature at a rate of 2500° C./hour;

LAF2 cold-rolling at a reduction rate of 71% for obtaining a cold strip with a final thickness e2 [of] 0.10 mm;

Final static annealing Rf at a temperature of 850° C. for 3 hours under pure hydrogen leading to total recrystallization, followed by cooling to room temperature at a rate of 250° C./hour.

The value of (T−Trc)·Lu/V was taken into account for the tests, knowing the value of the speed V of the strip and the recrystallization threshold Trc (around 600° C.). Lu (determined experimentally beforehand by means of the installation of thermocouples in the furnace) is 2.3 m in the present case and is a quantity to be considered as being within the framework of the invention.

Magnetic losses were measured on washers 0.1 mm thick and inner/outer diameters of 25/36 mm or 29.5/36 mm.

Table 6 shows the magnetic hysteresis characteristics measured in direct current: maximum induction of the cycle Bm for a maximum field of 20 Oe, the remanence Br of the same cycle at a maximum field of 20 Oe, the ratio Br/Bm between Br and the maximum induction, the coercive field Hc, depending upon the conditions of the continuous annealing (temperature T and speed V of the strip). The table also shows the magnetic losses observed at 2T, 400 Hz, as well as an index equal to (T−600)·tu, which is representative of the quantity of energy supplied during the intermediate annealing and is defined with respect to the start temperature of recrystallization Trc of the material, which is herein 600° C. Lu is the "effective length" of the furnace, i.e. the length of the path of the strip through the furnace over which the strip is at a temperature above Trc, and the "effective time" $t_u$ (in min) is the length of time the strip resides within the effective length of the furnace. The table also shows the surface or volume proportions (which is equivalent) of the three texture components characteristic of the invention.

TABLE 6

Magnetic characteristics measured on samples (0.1 mm thick washers) of the alloy 2 which have undergone double cold-rolling, intermediate annealing R1 (with Lu = 2.3 m) and final annealing Rf, depending upon the intermediate annealing conditions, and volume fractions of the texture components {001}<110>, {111}<112> and {111}<110>

| Recrystallized fraction | Intermediate annealing R1 | | Recrystallized fraction | Magnetic properties under DC, measured at a max field of 20 Oe (1600 A/m) | | | | Magn. Losses at 2 T, 400 Hz | (T − 600)/V | (T − 600)Lu/V | Fraction | Fraction of {111} | Fraction of {111} |
|---|---|---|---|---|---|---|---|---|---|---|---|---|---|
| before LAF1 | T (° C.) | V (m/min) | after R1 (%) | Bm (G) | Br (G) | Br/Bm | Hc after Rf (Oe) | after Rf (W/kg) | during R1 (° C. · min/m) | during R1 (° C. · min) | of {001} <110>(%) | <112> (%) | <110> (%) |
| 100% | 760 | 2.3 | 40 | 22550 | 11480 | 0.52 | 0.825 | 26.0 | 69.6 | 160 | 14.8 | 10.0 | 5.7 |
| 100% | 760 | 6.5 | 15 | 22180 | 10300 | 0.47 | 0.791 | 25.1 | 24.6 | 56.6 | 10 | 15.8 | 6.6 |
| 100% | 785 | 2.3 | 82 | 22290 | 13950 | 0.63 | 0.793 | 26.8 | 80.4 | 185 | 13 | 12.5 | 8 |
| 100% | 785 | 4.6 | 17 | 22250 | 10750 | 0.48 | 0.768 | 24.7 | 40.2 | 92.5 | 12 | 13.5 | 7.4 |
| 100% | 785 | 6.5 | 15 | 22070 | 9420 | 0.43 | 0.809 | 24.6 | 28.5 | 65.5 | 10.5 | 15 | 6.8 |
| 100% | 810 | 2.3 | 55 | 22300 | 13290 | 0.60 | 0.786 | 27.0 | 91.3 | 210 | 15.5 | 12 | 6.7 |
| 100% | 810 | 6.5 | 15 | 22300 | 12300 | 0.55 | 0.740 | 25.6 | 32.3 | 74.3 | 13 | 11.8 | 6.5 |
| 35% | 810 | 6.5 | 60 | 22160 | 10850 | 0.49 | 0.77 | 27.7 | 32.3 | 74.3 | 15 | 33.3 | 18.3 |

Figure 2:
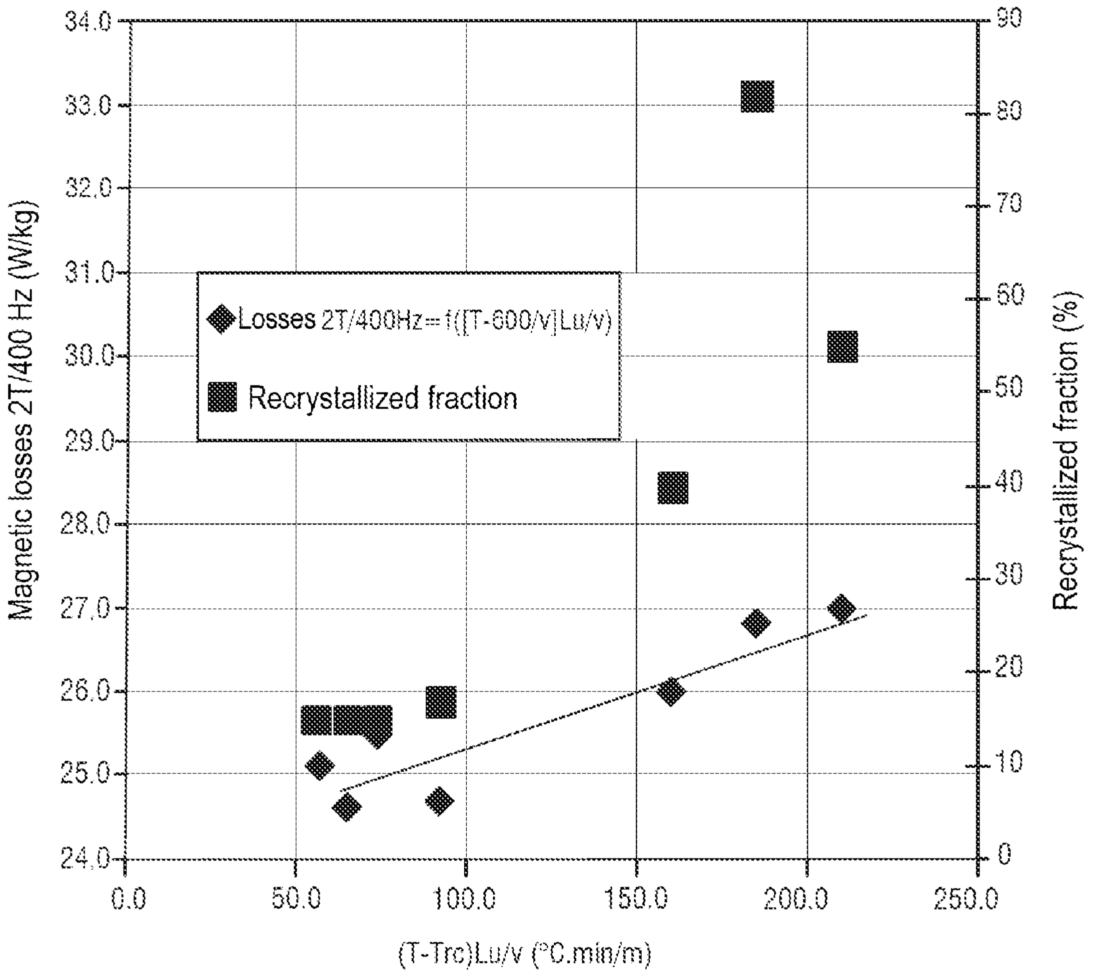
FIG. 2 shows, in W/kg, the magnetic losses under a field of 2T 400 Hz and the recrystallized fraction of various samples, as a function of the quantity $(T-Trc)\cdot Lu/V$ in ° C.·min for an effective furnace length (Lu) of 2.6 m.

FIGS. 1 and 2 show, for the examples which were 100% recrystallized before LAF1, the magnetic losses at 2T and 400 Hz and the recrystallized fraction of the samples as a function of the quantities (T−600)/V and (T−600)·Lu/V respectively, as defined above, 600° C. being the value of Trc.

It appears (FIG. 1) that the magnetic losses after LAF2 and Rf, all else being equal, are all the lower as the quantity (T−600)/V is low (V being the speed of the strip). If it is sought to obtain losses of at most 26.5 W/kg, in order to remain within the original goal of the invention, which was to keep losses on the order of 26 W/kg without requiring a careful choice of raw materials associated with a complex production of the ingot from which the strips are made, it is very preferable, for said specific example, not to exceed a value of (T−600)/V of 80° C. min/m, and preferentially 60° C. min/m (corresponding to losses <26 W/kg) if it is desired to obtain magnetic losses less than or equal to 26.5 W/kg. Such relatively low maximum value of (T−600)/V (in relation to the energy injected into the metal during R1) goes hand in hand with relatively low rates of recrystallization after R1, which can be estimated not to exceed 50%, preferentially 40%, better still 30%. The best examples have rates of recrystallizations on the order of 15 to 17%. A minimum rate of 10%, better still 15%, is necessary for intermediate annealing to be useful.

The first example of Table 6 has a degree or recrystallization of 40% during R1, and magnetic losses of 26 W/kg at 2T, 400 Hz after final annealing, which is just below the accepted maximum of 26.5 W/kg. Same is the illustration of the fact that a value of (T−600)/V between 60 and 80° C.·min/m can be suitable, but not optimal for the present case.

The maximum value (T−600)/V considered to be acceptable, is only indicative because same is valid for the present series of examples, over the reduced range of intermediate annealing temperatures 760-810° C. The limit of 80° C. min/m, preferentially 60° C. min/m, corresponds to a continuous annealing furnace with an effective length of 2.6 m. However (FIG. 2) the calculation of the acceptable limit can be generalized to any effective length Lu according to: (T−CRT)·Lu/V<60·Lu=160° C.·min, with Trc=600° C. Thereby, if the furnace considered is three times longer, the limit of 160° C.·min being invariant for the strip with a thickness of 0.35 mm, it will be necessary either to reduce the temperature T of the furnace, or to increase the speed V of the strip so as to satisfy (T−Trc)·Lu/V≤160° C.·min and thus not to over-recrystallize the strip during the annealing R1, allowing the magnetic losses at the final thickness 0.1 mm to be less than or equal to 26.5 W/kg on washers annealed for a few hours at 850° C., even better if the annealing is carried out above 850° C. (but below 900° C.).

Other examples are given in Table 5 on three different castings, following the same metallurgical range (same cold-rolling reduction rate, same hot transformations and same thickness after hot-rolling) with a continuous intermediate annealing varying from 3.6 to 4.4 m/min in a furnace with an effective length of 2.3 m, and a temperature of the homogeneous zone of the furnace of 840° C. during the continuous intermediate annealing (thus above the first zone of temperature considered hereinabove). It is thus verified, on such examples, with respect to the examples cited hereinabove where Lu=2.6 m, that in order to keep (T−600)·Lu/V<160° C./min, it is necessary to increase the continuous annealing temperature T when Lu is reduced, all else being equal. The first inequality is thus used for taking into account the effective length Lu of the furnace in the use of the invention.

In other words, empirically and unexpectedly, it can be seen that, during the intermediate annealing R1 preceding the last cold-rolling, it is necessary to be placed above the complete recrystallization temperature Trc, which is on the order of 600° C. for the alloys concerned by the examples given, but that once said temperature has been reached, it is not necessary either to bring an excessive amount of total heat to the metal, in order not to obtain too much recrystallization. Such requirements are met by combining the temperature and the duration of the intermediate annealing R1, the latter parameter being represented by the running speed in the furnace for a given furnace length. Taking into account the parameter (T−Trc)·Lu/V under the aforementioned conditions allows said parameters to be taken into account in order to quantify the heat applied to the strip and to ensure that, given the kinetics of the recrystallization, the recrystallization rate provided by R1 remains within the prescribed limits, although the temperature Trc is exceeded during R1.

If the intermediate annealing R1 preceding the last cold-rolling LAF2 is insufficient for initiating the recrystallization while the strip is at an intermediate thickness between the thickness of the hot-rolled strip and the final thickness of the cold-rolled strip, then the intermediate annealing R1 does not have the sought for metallurgical effect, and everything happens as if, from the point of view of the problems that the invention aims to solve, there was no intermediate annealing, and that the cold-rolling(s) subsequent to the first of them were only additional passes forming, taken together, a single cold-rolling step.

If more than three cold-rolling sequences are performed and thus at least two intermediate annealings R1 and R1 are performed, the last intermediate annealing R1, i.e. the annealing performed before the last cold-rolling LAF2 which precedes the final annealing Rf, has to satisfy the conditions required by the invention on the degree of recrystallization of the semi-finished product before Rf.

When trying to correlate the measurements of magnetic losses with some of the most classical microstructural characteristics such as grain size, the part of $\alpha$ or $\gamma$ fiber texture, no apparent result is obtained. However, it can be assumed that the increased isotropy of the texture provided by the double cold-rolling (see Table 5) would contribute to such improvement.

On the other hand, experience shows that an influence of the recrystallized fraction is observed after the intermediate annealing R1. The recrystallized fraction should not be too high. In other words, the residence of the strip in the effective length Lu of the annealing furnace, for a given temperature T greater than Trc, should not be too prolonged, which is, moreover, reflected by the relation:

$$26^\circ\ \text{C.}\cdot\text{min} \leq (T-Trc)\cdot Lu/V \leq 160^\circ\ \text{C.}\cdot\text{min},$$

$$\text{preferentially } 50^\circ\ \text{C. min} \leq (T-Trc)\cdot Lu/V \leq 160^\circ\ \text{C. min}$$

which is one of the conditions of being in line with the invention.

However, if the recrystallization can be low, it should not be zero.

A test was also carried out (last row of Table 6) on a sample which was not completely recrystallized before LAF1 (35% degree of recrystallization), under the same operating conditions, as regards LAF1, R1, LAF2 and Rf, for the example according to the invention which precedes it in table 6. It is observed, on such example, compared to the example according to the invention, that the texture component {111}<112> has a much more pronounced preponderance on the final product, and that the magnetic losses are increased, probably because of the stronger anisotropy of the texturing, that the double cold-rolling included in the invention did not sufficiently correct.

As a comparison, tests were carried out on samples of the alloy 2, hot-rolled and cooled under the same conditions as the previous examples but having undergone a single cold-rolling sequence LAF, changing the samples from 2.0 to 1.0 mm, followed by a final annealing Rf under the same conditions as the previous examples.

After the final static annealing Rf, the samples had magnetic losses on the order of 27 W/kg, which are thus considered too high to meet the goals assigned to the invention.

The above shows that the double-rolling LAF1+LAF2, with an intermediate annealing R1 entailing a very partial recrystallization and carried out under the conditions prescribed by the invention, substantially improves the magnetic losses of the metal, all else being equal. A strip which remains mainly strain-hardened, or even restored, before the final static annealing Rf for recrystallization, does not have the low magnetic losses of the strips treated according to the invention, all else being equal.

Satisfying the condition $26^\circ$ C.·min≤(T−Trc)·Lu/V≤$160^\circ$ C.·min, preferentially $50^\circ$ C.·min≤(T−Trc)·Lu/V≤$160^\circ$ C.·min, ensures a sufficient degree or recrystallization so as to lower the magnetic losses to the desired level.

It is not excluded that, after the static annealing Rf which is the final annealing in the examples described, other heat or thermomechanical treatments can be carried out, e.g. for improving the aptitude for cutting a strip obtained after the static annealing, if such treatments do not deteriorate the expected properties mentioned.

Indeed, as has been said, the final static annealing Rf can be performed on parts cut from the cold-rolled strip (e.g. rotors, stators, transformer core elements, etc.). However, if it turns out that the aptitude for the cold-rolled and statically annealed strip to be cut is not sufficient for the intended application, the static annealing Rf can be performed on the coiled cold-rolled strip, and then a new annealing can be performed on the statically annealed strip, this time continuously, under reducing atmosphere (preferentially pure hydrogen), under conditions of running speed and length and temperature of the furnace which allow the strip to reach a temperature between 700 and 900° C. for 10 s to 1 h, preferentially 10 s to 20 min. Such temperature corresponds to the disordered ferritic range, which must be reached before the onset of a sufficiently rapid temperature drop. The annealing ends with relatively rapid cooling (at least 1000° C./hour). Such new annealing and subsequent cooling improve the aptitude of the strip for being cut, which is advantageous for certain applications where the final part (or an assembly of such final parts) has to be cut with high precision or under difficult conditions. Same have no influence on the texturing of the strip. Beyond 900° C., a phase transformation would be obtained which would degrade the properties.

Such is the case, more particularly, when the final parts are electrical engineering parts, formed first by the overlaying of unitary parts larger than the final part, each coated with an insulating varnish and assembled by bonding so as to form a multilayer assembly. Said multilayer assembly is then cut to the precise final dimensions thereof, which can only be carried out easily if the unit parts have an excellent aptitude for being cut, which only the last continuous annealing and the subsequent cooling provide, in certain cases.

An exemplary embodiment relates to a substantially equiatomic FeCo-alloy cold-rolled strip or sheet, and to a magnetic part cut from same, as well as to a method for fabricating a Fe—Co-alloy cold-rolled strip or sheet. A fully recrystallized hot-rolled sheet or strip is prepared, with a thickness of 1.5-2.5 mm and the following composition: 47.0%≤Co≤51.0%; traces≤V+W≤3.0%; traces≤Ta+Zr≤0.5%; traces≤Nb≤0.5%; traces≤B≤0.05%; traces≤Si≤3.0%; traces≤Cr≤3.0%: traces≤Ni≤5.0%; traces≤Mn≤2.0%; traces≤O≤0.03%; traces≤N≤0.03%; traces≤S≤0.005%; traces≤P≤0.015; traces≤Mo≤0.3%; traces≤Cu≤0.5%; traces≤Al≤0.01%; traces≤Ti≤0.01%; traces≤Ca+Mg≤0.05%; traces≤rare earths≤500 ppm; the remainder being iron and impurities. A first cold-rolling step is carried out with a reduction rate of 70% to 90%, to bring the strip or sheet to a thickness of ≤1 mm. Intermediate annealing is carried out when running, leading to a partial recrystallization of the strip or sheet, running at a speed (V), and where its temperature, in the useful zone of the furnace of useful length (Lu), is between Trc and 900° C., the strip or sheet remaining therein for 15 s to 5 min at a temperature (T) such that 26° C.·min≤T−Trc)·Lu/V≤160° C. min. The strip or sheet is cooled to at least 600° C./hour. A second step of cold-rolling the annealed strip or sheet is carried out, with a reduction rate of 60% to 80%, to bring the strip or sheet to a thickness of 0.05 to 0.25 mm. And final annealing (Rf) of the cold-rolled strip or sheet is carried out to achieve complete recrystallization followed by cooling at 100 to 500° C./hour.

Magnetic part, such as a magnetic core, obtained from a strip or sheet manufactured by this method.

The invention claimed is:

1. A method for manufacturing of a cold-rolled strip or sheet of substantially equiatomic FeCo-alloy, wherein:

a hot-rolled strip or sheet with a thickness comprised between 1.5 mm and 2.5 mm is prepared, the hot-rolled strip or sheet having a composition consisting of, in percentages by weight, 47.0%≤Co≤51.0%;
0%≤V+W≤3.0%;
0%≤Ta+Zr≤0.5%;
0%≤Nb≤0.5%;
0%≤B≤0.05%;
0%≤Si≤3.0%;
0%≤Cr≤3.0%;
0%≤Ni≤5.0%;
0%≤Mn≤2.0%;
0%≤C≤0.02%;
0%≤O≤0.03%;
0%≤N≤0.03%;
0%≤S≤0.005%;
0%≤P≤0.015;
0%≤Mo≤0.3%;
0%≤Cu≤0.5%;
0%≤Al≤0.01%;
0%≤Ti≤0.01%;
0%≤Ca+Mg≤0.05%;
0%≤rare earths≤500 ppm;

a remainder being iron and impurities resulting from melting;

said hot-rolled strip or sheet having a recrystallization start temperature Trc and a 100% recrystallized microstructure;

then a first cold-rolling step of the hot-rolled strip or sheet is carried out in one or a plurality of passes, with an overall reduction ratio TR1 of 70% to 90%, to bring the strip or sheet to a thickness e1 less than or equal to 1 mm;

an intermediate annealing R1 is then carried out as the strip or sheet passes through an annealing furnace, leading to a partial recrystallization of the strip or sheet, a degree of partial recrystallization being from 10% to 50%, and the temperature of the strip or sheet, in an effective zone of the annealing furnace having an effective length Lu, is comprised between Trc and 900° C., the strip or sheet remaining in the effective zone Lu for 15 s to 5 min at a temperature T such that 26° C. min≤(T−Trc)×Lu/V≤160° C. min, with T and Trc in ° C., Lu in meter, V being a travelling speed of the strip or sheet through the annealing furnace, in meter/min, and the strip or sheet being cooled at an exit of the annealing furnace at a rate of at least 600° C./hour, down to a temperature less than or equal to 200° C., thereby obtaining an annealed steel sheet or strip;

a second cold-rolling step of the annealed sheet or strip being then carried out, in one or a plurality of passes, with an overall reduction ratio of 60% to 80%, bringing the cold-rolled strip or sheet to a thickness of 0.05 to 0.25 mm;

the cold-rolled strip or sheet, having been subjected to the second cold-rolling then undergoing a static final annealing for at least 30 minutes, at a temperature of 750 to 900° C., in an atmosphere consisting of argon and/or nitrogen, in a reducing atmosphere or under vacuum, in order to obtain a complete recrystallization of the cold-rolled strip or sheet, followed by cooling at a rate of 100 to 500° C./hour.

2. The method according to claim 1, wherein (V+W)/2+(Ta+Zr)/0.2≥0.8%.

3. The method according to claim 1 wherein 0%≤Si≤0.1%.

4. The method according to claim 1 wherein 0%≤Cr≤0.1%.

5. The method according to claim 1, wherein before said first cold-rolling step, at least one additional cycle of additional cold-rolling and additional intermediate annealing is carried out to bring the cold-rolled strip or sheet to a thickness comprised between a thickness of the strip or sheet after hot-rolling and an input thickness of the first cold-rolling step, during each additional intermediate annealing, a passage time of the strip or sheet in the effective zone of the furnace, between Trc and 900° C., leading to a total recrystallization of the strip or of the sheet, each additional intermediate annealing Ri having a passage time in the effective zone of effective length Lu of the annealing furnace, where the temperature of the strip or sheet is between Trc and 900° C., of 10 s to 10 min, followed by a cooling of the strip or of the sheet at the exit of the annealing furnace at a rate of at least 600° C./hour, down to a temperature less than or equal to 200° C., the strip or sheet having a 100% recrystallized microstructure after the last of said additional intermediate annealings.

6. The method according to claim 5 wherein the additional intermediate annealing is a continuous annealing of the strip or sheet and the additional cold-rolling is performed in one or a plurality of passes, with an overall reduction rate of at least 40%.

7. The method according to claim 1 wherein after hot-rolling and before the first cold-rolling step, the hot rolled strip or sheet undergoes hyper-quenching, by cooling the hot-rolled strip or sheet from a temperature comprised between 80° and 1000° C. at a rate of at least 600° C./s, down to room temperature.

8. The method according to claim 7, wherein said hyper-quenching takes place directly after the hot-rolling, without any intermediate reheating.

9. The method according to claim 1, wherein the atmospheres of the annealing furnace and in the static final annealing are reducing.

10. The method according to claim 1, wherein after the static final annealing, an additional continuous annealing of the cold-rolled strip or sheet having been subjected to the static final annealing is carried out, so that the alloy reaches at least 700° C. and at most 900° C., for at least 10 seconds and at most 1 h, followed by cooling at a rate of at least 1000° C./hour.

11. A method for manufacturing of a cold-rolled strip or sheet of substantially equiatomic FeCo-alloy, wherein:

a hot-rolled strip or sheet with a thickness comprised between 1.5 and 2.5 mm is prepared, the hot-rolled strip or sheet having a composition consisting of, in percentages by weight 47.0%≤Co≤51.0%;

0%≤V+W≤3.0%;

0%≤Ta+Zr≤0.5%;

0%≤Nb≤0.5%;

0%≤B≤0.05%;

0%≤Si≤3.0%;

0%≤Cr≤3.0%;

0%≤Ni≤5.0%;

0%≤Mn≤2.0%;

0%≤C≤0.02%;

0%≤O≤0.03%;

0%≤N≤0.03%;

0%≤S≤0.005%;

0%≤P≤0.015;

0%≤Mo≤0.3%;

0%≤Cu≤0.5%;

0%≤Al≤0.01%;

0%≤Ti≤0.01%;

0%≤Ca+Mg≤0.05%;

0%≤rare earths≤500 ppm;

a remainder being iron and impurities resulting from melting;

said hot-rolled strip or sheet having a recrystallization start temperature Trc and a 100% recrystallized microstructure;

then a first cold-rolling step of the hot-rolled strip or sheet is carried out in one or a plurality of passes, with an overall reduction ratio TR1 of 70% to 90%, to bring the strip or sheet to a thickness e1 less than or equal to 1 mm;

an intermediate annealing R1 is then carried out as the strip or sheet passes through an annealing furnace, leading to a partial recrystallization of the strip or sheet, a degree of partial recrystallization being from 10% to 50%, and the temperature of the strip or sheet, in an effective zone of the annealing furnace having an effective length Lu, is comprised between Trc and 900° C., the strip or sheet remaining in the effective zone Lu for 15 s to 5 min at a temperature T such that 26° C. min≤(T−Trc)×Lu/V≤160° C. min, with T and Tre in ° C., Lu in meter, V being a travelling speed of the strip or sheet through the annealing furnace, in meter/min, and the strip or sheet being cooled at an exit of the annealing furnace at a rate of at least 600° C./hour, down to a temperature less than or equal to 200° C., to obtain an annealed steel sheet or strip;

a second cold-rolling step of the annealed sheet or strip being then carried out, in one or a plurality of passes, with an overall reduction ratio of 60% to 80%, bringing the cold-rolled strip or sheet to a thickness of 0.05 to 0.25 mm;

cutting the cold-rolled strip or sheet having been subjected to the second cold-rolling, thereby obtaining a part;

the part then undergoing a static final annealing for at least 30 minutes, at a temperature of 750 to 900° C., in an atmosphere consisting of argon and/or nitrogen, in a reducing atmosphere or under vacuum, in order to obtain a complete recrystallization of the part, followed by cooling at a rate of 100 to 500° C./hour.

* * * * *